United States Patent
Fang et al.

(10) Patent No.: US 11,158,077 B2
(45) Date of Patent: Oct. 26, 2021

(54) DISPARITY ESTIMATION

(71) Applicant: NEXTVPU (SHANGHAI) CO., LTD., Shanghai (CN)

(72) Inventors: Shu Fang, Shanghai (CN); Ji Zhou, Shanghai (CN); Xinpeng Feng, Shanghai (CN)

(73) Assignee: Nextvpu (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 17/127,540

(22) Filed: Dec. 18, 2020

(65) Prior Publication Data

US 2021/0209782 A1 Jul. 8, 2021

Related U.S. Application Data

(63) Continuation of application No. PCT/CN2020/121824, filed on Oct. 19, 2020.

(30) Foreign Application Priority Data

Dec. 13, 2019 (CN) .......................... 201911281475.1

(51) Int. Cl.
*G06K 9/00* (2006.01)
*G06T 7/593* (2017.01)
(Continued)

(52) U.S. Cl.
CPC ................ *G06T 7/593* (2017.01); *G06K 9/46* (2013.01); *G06K 9/6232* (2013.01); *G06T 3/40* (2013.01)

(58) Field of Classification Search
CPC . G06T 7/593; G06T 3/40; G06K 9/46; G06K 9/6232
See application file for complete search history.

(56) References Cited

U.S. PATENT DOCUMENTS 5,727,078 A * 3/1998 Chupeau .............. H04N 13/261
  382/154
8,737,723 B1 * 5/2014 Kwatra ................. G06T 15/205
  382/154
(Continued)

FOREIGN PATENT DOCUMENTS

CN 106600583 A 4/2017
CN 108335322 A 7/2018
(Continued)

OTHER PUBLICATIONS

Anytime Stereo Imag Depth Estimation—Devices, Yan Wang et al., arXiv: 1810.11408v2, Mar. 5, 2019, pp. 1-6 (Year: 2019).*
(Continued)

*Primary Examiner* — Jayesh A Patel
(74) *Attorney, Agent, or Firm* — Seed IP Law Group LLP

(57) ABSTRACT

A disparity estimation method, an electronic device, and a computer-readable storage medium are provided. The disparity estimation method includes: performing feature extraction on each image in an image pair; and performing cascaded multi-stage disparity processing according to the extracted image features to obtain multiple disparity maps with increasing sizes. The input of a first stage disparity processing in the multi-stage disparity processing includes multiple image features each having a size corresponding to the first stage disparity processing, and the input of disparity processing of each stage other than the first stage disparity processing in the multi-stage disparity processing includes: one or more image features each having a size corresponding to disparity processing of the stage and a disparity map generated by disparity processing of an immediate previous stage.

13 Claims, 6 Drawing Sheets

(51) Int. Cl.
  *G06K 9/62* (2006.01)
  *G06T 3/40* (2006.01)
  *G06K 9/46* (2006.01)

(56) References Cited

U.S. PATENT DOCUMENTS

| | | | |
|---|---|---|---|
| 9,600,889 B2* | 3/2017 | Boisson | G06T 7/593 |
| 9,704,252 B2* | 7/2017 | Jachalsky | G06K 9/52 |
| 10,074,158 B2* | 9/2018 | Siddiqui | G06T 3/4007 |
| 10,380,753 B1* | 8/2019 | Csordas | G06K 9/6202 |
| 10,839,543 B2* | 11/2020 | Cheng | G06K 9/4628 |
| 2007/0024614 A1* | 2/2007 | Tam | G06T 7/13 |
| | | | 345/419 |
| 2007/0071311 A1* | 3/2007 | Rovira-Mas | G06K 9/00805 |
| | | | 382/154 |
| 2011/0176722 A1* | 7/2011 | Sizintsev | G06T 7/97 |
| | | | 382/154 |
| 2012/0008857 A1* | 1/2012 | Choi | G06T 7/593 |
| | | | 382/154 |
| 2014/0147031 A1* | 5/2014 | Rzeszutek | G06T 7/593 |
| | | | 382/154 |
| 2015/0178936 A1* | 6/2015 | Boisson | H04N 13/271 |
| | | | 382/154 |
| 2015/0254864 A1* | 9/2015 | Jachalsky | G06T 7/97 |
| | | | 382/190 |
| 2019/0014303 A1* | 1/2019 | Zhu | H04N 13/271 |
| 2019/0295282 A1 | 9/2019 | Smolyanskiy et al. | |
| 2020/0334819 A1* | 10/2020 | Chen | G06T 7/11 |

FOREIGN PATENT DOCUMENTS

| | | | |
|---|---|---|---|
| CN | 109472819 A | * | 3/2019 |
| CN | 109472819 A | | 3/2019 |
| CN | 110148179 A | | 8/2019 |
| CN | 110427968 A | | 11/2019 |
| EP | 3070671 A1 | * | 9/2016 ............... G06K 9/52 |
| JP | 2015-100065 A | | 5/2015 |
| JP | 2017520852 A | * | 7/2017 |
| JP | 2017520852 A | | 7/2017 |
| JP | 2019096294 A | | 6/2019 |
| JP | 2019121349 A | | 7/2019 |
| JP | 2019-184587 A | | 10/2019 |
| KR | 10-0762670 B1 | | 10/2007 |
| KR | 10-1178015 B1 | | 8/2012 |

OTHER PUBLICATIONS

Airborne Vehicle Detection in Dense Urban Areas Using HoG Features and Disparity Maps, Sebastian Tuermer et al., IEEE, 1939-1404, 2013, pp. 2327-2337 (Year: 2013).*

Neural Disparity Map Estimation from Stereo Image, Nadia Baha et al., The International Arab Journal of Information Technology, vol. 9, No. 3, May 2012, pp. 217-224 (Year: 2012).*

Stereo Matching Algorithm Based on Multi-Scale Information and Attention, Chen, China Academic Journal Electronic Publishing House, 2019, p. 10-22, (Year: 2019).*

GHRNET: Guided Hierarchical Refinement Network for Stereo Matching, Bin Tan et al., IEEE, 978-1-5386-6249-6, 2019, pp. 4459-4463 (Year: 2019).*

Chen, "Stereo Matching Algorithm Based on Multi-Scale Information and Attention," China Academic Journal Electronic Publishing House, p. 10-22, 2019.

Song et al., "EdgeStereo: A Context Integrated Residual Pyramid Network for Stereo Matching", arXiv:1803.05196v3 [cs.CV], Sep. 23, 2018, (16 pages).

Wang et al., "Anytime Stereo Image Depth Estimation on Mobile Devices", arXiv:1810.11408v2 [cs.CV], Mar. 5, 2019, (8 pages).

Tan et al., "Ghrnet: Guided Hierarchical Refinement Network for Stereo Matching", School of Remote Sensing and Information Engineering, Wuhan University, 2019, (5 pages).

* cited by examiner

DISPARITY ESTIMATION

CROSS-REFERENCE TO RELATED APPLICATION

This disclosure is a continuation application of International Application No. PCT/CN2020/121824, filed on Oct. 19, 2020, which claims priority to and benefits of Chinese Patent Application No. 2019112814751, filed on Dec. 13, 2019. For various purposes, the entire content of the aforementioned application is incorporated herein by reference.

TECHNICAL FIELD

The present disclosure relates to the field of computer vision technologies, and more particular, to a disparity estimation method, an electronic device, and a computer-readable storage medium.

BACKGROUND

In the related art, computer vision technologies can be used to obtain the disparity between each pair of matching pixels in two images of different angle of views for the same scene, to obtain the disparity map, and depth information of the scene can be obtained based on the disparity map. Depth information may be used in various fields such as three-dimensional reconstruction, automated driving, and obstacle detection. For example, methods for obtaining disparity by using computer vision technologies may include local area matching methods, global optimization methods, semi-global methods, methods based on neural network such as convolutional neural network, etc.

The methods described in this section are not necessarily methods that have been previously conceived or adopted. It should not be assumed that any of the methods described in this section are considered as prior art merely by virtue of their inclusion in this section, unless otherwise indicated. Similarly, the problem mentioned in this section should not be considered to be recognized in any prior art, unless otherwise indicated.

SUMMARY

According to an aspect of the present disclosure, a disparity estimation method is provided. The disparity estimation method includes: performing feature extraction on each image in an image pair; and performing cascaded multi-stage disparity processing according to extracted image features to obtain multiple disparity maps with increasing sizes, e.g., successively increasing sizes. An input of a first stage disparity processing in the multi-stage disparity processing includes multiple image features each having a size corresponding to the first stage disparity processing, and an input of disparity processing of each stage other than the first stage disparity processing in the multi-stage disparity processing includes: one or more image features each having a size corresponding to disparity processing of the stage and a disparity map generated by disparity processing of an immediate previous stage.

According to another aspect of the present disclosure, an electronic device is provided. The electronic device includes a processor and a memory that stores a program. The program including instructions that, when executed by the processor, cause the processor to perform the method according to the present disclosure.

According to another aspect of the present disclosure, a computer-readable storage medium that stores a program is provided, the program including instructions that, when executed by a processor of an electronic device, cause the electronic device to perform the method according to the present disclosure.

More features and advantages of the present disclosure will become apparent from exemplary embodiments described below with reference to the accompanying drawings.

BRIEF DESCRIPTION OF THE DRAWINGS

The drawings, which exemplarily illustrate embodiments and constitute a part of the specification, together with the text description of the specification, serve to explain exemplary implementations of the embodiments. The illustrated embodiments are for illustrative purposes only and do not limit the scope of the claims. Throughout the drawings, the same reference signs denote similar but not necessarily the same elements.

DETAILED DESCRIPTION

Figure 1:
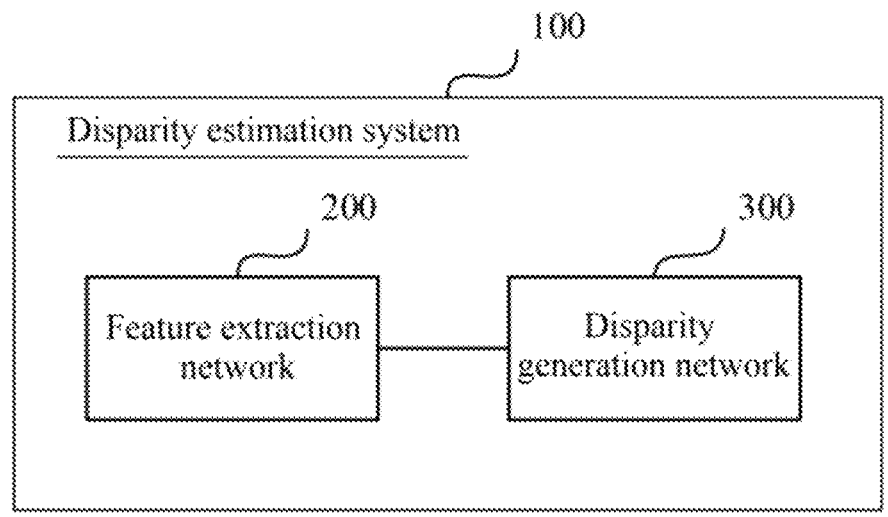
FIG. 1 is a block diagram illustrating a disparity estimation system according to exemplary embodiments of the present disclosure.

In the present disclosure, unless otherwise stated, the terms "first", "second", etc., used to describe various elements are not intended to limit the positional, temporal or importance relationship of these elements, but rather only to distinguish one component from the other. In some examples, the first element and the second element may point to the same instance of the elements, and in some cases, based on contextual descriptions, they may also refer to different instances.

The terms used in the description of the various examples in the present disclosure are merely for the purpose of describing particular examples, and are not intended to be limiting. Unless the context clearly indicates otherwise, if the number of elements is not specifically defined, the number of the elements may be one or more. Moreover, the term "and/or" used in the present disclosure encompasses any of and all possible combinations of listed items.

In the related art, computer vision technologies can be used to obtain the disparity between each pair of matching pixels in two images of different angle of views for the same scene, to obtain the disparity map, and depth information of the scene can be obtained based on the disparity map. Depth information may be used in various fields such as three-dimensional reconstruction, automated driving, and obstacle detection. For example, methods for obtaining disparity by using computer vision technologies may include local area matching methods, global optimization methods, semi-global methods, methods based on neural network such as convolutional neural network, etc.

The local area matching method mainly includes operations such as matching cost computation, cost aggregation, disparity computation, and disparity refinement. It has a high speed and low energy consumption, but its algorithm effect is related to algorithm parameters (such as the size of the matching window), which is difficult to meet requirements of complex scenes. Compared with the local area matching method, the global optimization method has better matching accuracy. It makes an assumption for the smoothing term, and transforms disparity computation into an energy optimization problem. Further, most global optimization methods do not have cost aggregation step, by considering the matching cost and the smoothing term, an energy function is proposed for the global point, and the disparity is obtained by minimizing the energy function. However, compared with the local area matching method, the global optimization method has more computation and higher energy consumption. The semi-global method can balance matching accuracy and computation speed to a certain extent. Unlike the global algorithm that optimizes the global point, the semi-global method divides the energy function of each point into paths in multiple directions, solves the value of each path, and then adds the values of all paths to obtain the energy of the point. The value of each path can be solved by dynamic planning. However, compared with the local area matching method, the semi-global method also requires more computation and higher energy consumption. The method based on neural network such as the convolutional neural network (CNN) can obtain a larger perceptual field by constructing a disparity network, and can have a better disparity prediction capability in an untextured region of the image. However, its computation amount is related to parameters of the neural network and the image size. The more complex the network parameter and the larger image size are, the greater the memory consumption and the lower the running speed are.

The present disclosure provides a disparity estimation system, it can perform cascaded multi-stage disparity processing based on extracted image features of each image in an image pair, to obtain multiple disparity maps with increasing sizes, e.g., successively increasing sizes. The input of a first stage disparity processing in the multi-stage disparity processing may include multiple image features each having a size corresponding to the first stage disparity processing. The input of disparity processing of each stage other than the first stage disparity processing in the multi-stage disparity processing may include: one or more image features each having a size corresponding to the disparity processing of the stage and a disparity map generated by disparity processing of an immediate previous stage. In other words, by performing cascaded multi-stage disparity processing on the extracted image features, in which the input of disparity processing of each stage includes the image feature having the size corresponding to the disparity processing of the stage, multiple disparity maps of different sizes can be obtained at one time for use by multiple disparity maps target devices with different performance or different accuracy requirements, such that accuracy and speed requirements of different target devices can be met, and flexibility and applicability of the disparity estimation system can also be improved. Exemplary embodiments of the disparity estimation system of the present disclosure will be further described below with reference to the accompanying drawings.

FIG. 1 is a block diagram illustrating a disparity estimation system according to exemplary embodiments of the present disclosure. As shown in FIG. 1, the disparity estimation system 100 may include, for example, a feature extraction network 200 and a disparity generation network 300. The feature extraction network 200 is configured to perform feature extraction on each image in an image pair and output extracted image features to the disparity generation network 300. The disparity generation network 300 is configured to perform cascaded multi-stage disparity processing according to the extracted image features to obtain multiple disparity maps with increasing sizes, e.g., successively increasing sizes. The input of a first stage disparity processing in the multi-stage disparity processing includes multiple image features each having a size corresponding to the first stage disparity processing. The input of disparity processing of each stage other than the first stage disparity processing of the multi-stage disparity processing includes: one or more image features each having a size corresponding to the disparity processing of the stage and a disparity map generated by disparity processing of an immediate previous stage.

According to the disparity estimation system shown in the block diagram in FIG. 1, cascaded multi-stage disparity processing may be performed based on the extracted image features of each image in the image pair to obtain multiple disparity maps with increasing sizes, e.g., successively increasing sizes. The input of the disparity processing of each stage may include an image feature having the size corresponding to the disparity processing of the stage. Thereby, multiple disparity maps of different sizes can be obtained at one time for use by multiple target devices with different performance or different accuracy requirements, such that accuracy and speed requirements of different target devices can be met, and flexibility and applicability of the disparity estimation system can also be improved.

In the present disclosure, the image pair may be an image pair for the same scene captured by a multiocular camera. The size of each image in the image pair is the same, and the corresponding angle of view is different. Certainly, the image pair may also be the image pair meeting requirements acquired in other manners (e.g., acquired from other third-party devices). In addition, each image in the image pair may be a grayscale image or a color image.

In the present disclosure, the multiocular camera refers to a camera configured with two, three or more lenses and capable of performing static or dynamic image photographing, it can cover scenes of different angle of views or ranges through the configured multiple lenses, so as to enhance its capability for detecting objects in the scene. Taking a binocular camera configured with two lenses (e.g., a left lens and a right lens) as an example, for any scene, the binocular camera can capture, through the configured two lenses, two images (e.g., a left-view image and a right-view image) of the scene with the same size and different photographing angles. The image pair formed by the two images may be used to determine displacement (e.g., horizontal displacement), i.e., disparity, of objects in the scene between corresponding pixels in the two images, so as to determine depth information such as distance of the object.

In addition, in the present disclosure, the disparity estimation system 100 and the multiocular camera may be independent of each other. In other words, the disparity estimation system 100 can perform, by the feature extraction network 200, feature extraction on each image in the image pair for the same scene captured by the multiocular camera, and perform, by the disparity generation network 300, cascaded multi-stage disparity processing on the extracted image features, so as to obtain multiple disparity maps with increasing sizes, e.g., successively increasing sizes. As an alternative, the multiocular camera may also be part of the disparity estimation system 100. In other words, the disparity estimation system 100 may include the multiocular camera, in addition to the feature extraction network 200 and the disparity generation network 300.

According to some embodiments, the image feature of each image in the image pair extracted by the feature extraction network 200 of the disparity estimation system 100 may include at least one or more of: a basic structure feature, a semantic feature, an edge feature, a texture feature, a color feature, an object shape feature, or an image-self-based feature.

Figure 2:
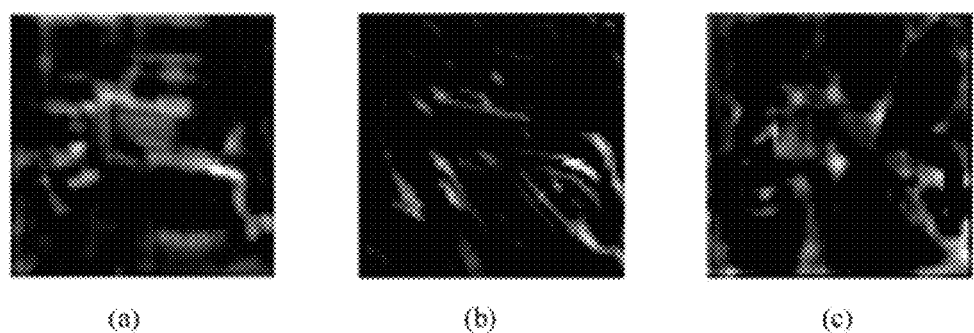
FIG. 2 is a schematic diagram illustrating basic structure features of an image according to exemplary embodiments of the present disclosure.

FIG. 2 illustrates, in three images (a), (b) and (c) (e.g., grayscale images or color images), a schematic diagram of basic structure features of an image that may be extracted according to exemplary embodiments of the present disclosure. As can be seen from FIG. 2, the basic structure feature may refer to the feature for reflecting various fine structures of the image.

Figure 3:
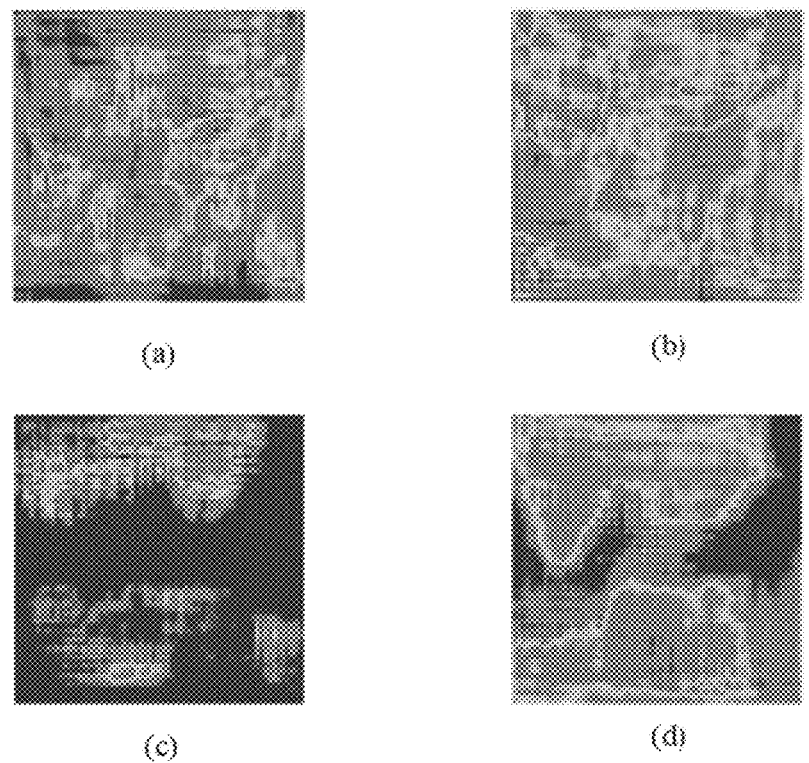
FIG. 3 is a schematic diagram illustrating semantic features of an image according to exemplary embodiments of the present disclosure.

FIG. 3 illustrates, in four images (a), (b), (c) and (d) (e.g., grayscale images or color images), a schematic diagram of semantic features of an image that may be extracted according to exemplary embodiments of the present disclosure. As can be seen from FIG. 3, the semantic feature may refer to the feature that can distinguish different objects or different types of objects in the image. In addition, accuracy of disparity determination of an ambiguous region (e.g., a large flat region) of the image can be improved based on the semantic feature.

Figure 4:
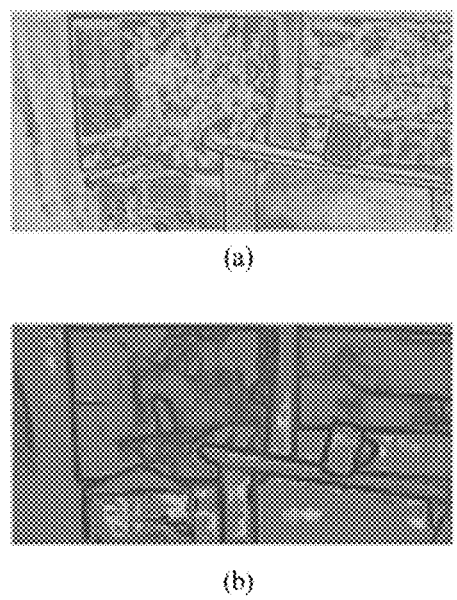
FIG. 4 is a schematic diagram illustrating edge features of an image according to some exemplary embodiments of the present disclosure.

FIG. 4 illustrates, in two images (a) and (b) (e.g., grayscale images or color images), a schematic diagram of edge features of an image that may be extracted according to exemplary embodiments of the present disclosure. As can be seen from FIG. 4, the edge feature may refer to the feature that can reflect boundary information of the object or the region in the image.

In some examples, the texture feature may refer to the feature that can reflect the texture of the image, the color feature may refer to the feature that can reflect the color of the image, and the object shape feature may refer to the feature that can reflect the shape of the object in the image. The image-self-based feature may refer to the image itself, or the image obtained by upsampling or downsampling the image itself with a certain coefficient or ratio. The coefficient or the ratio for the upsampling or the downsampling may be, for example, 2, 3, or other values greater than 1.

According to some embodiments, in the present disclosure, in addition to the image-self-based feature, each other image feature can be obtained, by a corresponding feature extraction sub-network, by performing feature extraction on the image, so as to improve the efficiency of image feature extraction and thus improve the efficiency of disparity estimation. In addition, in order to improve the accuracy of disparity estimation, feature extraction may be performed on the image from at least three different dimensions of the basic structure feature, the semantic feature, and the edge feature.

Figure 5:
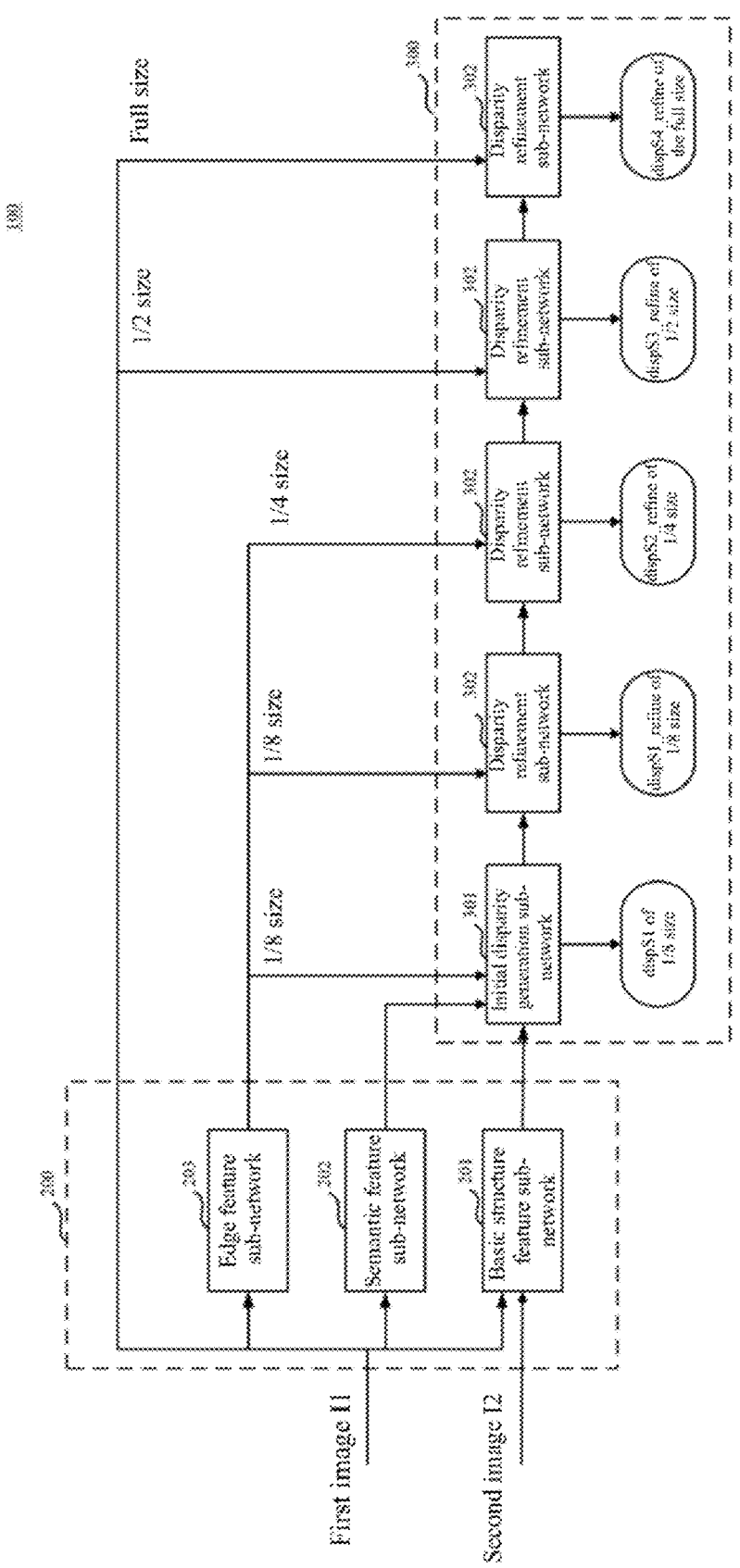
FIG. 5 is a block diagram illustrating a possible overall structure of a disparity estimation system according to exemplary embodiments of the present disclosure.
Figure 6:
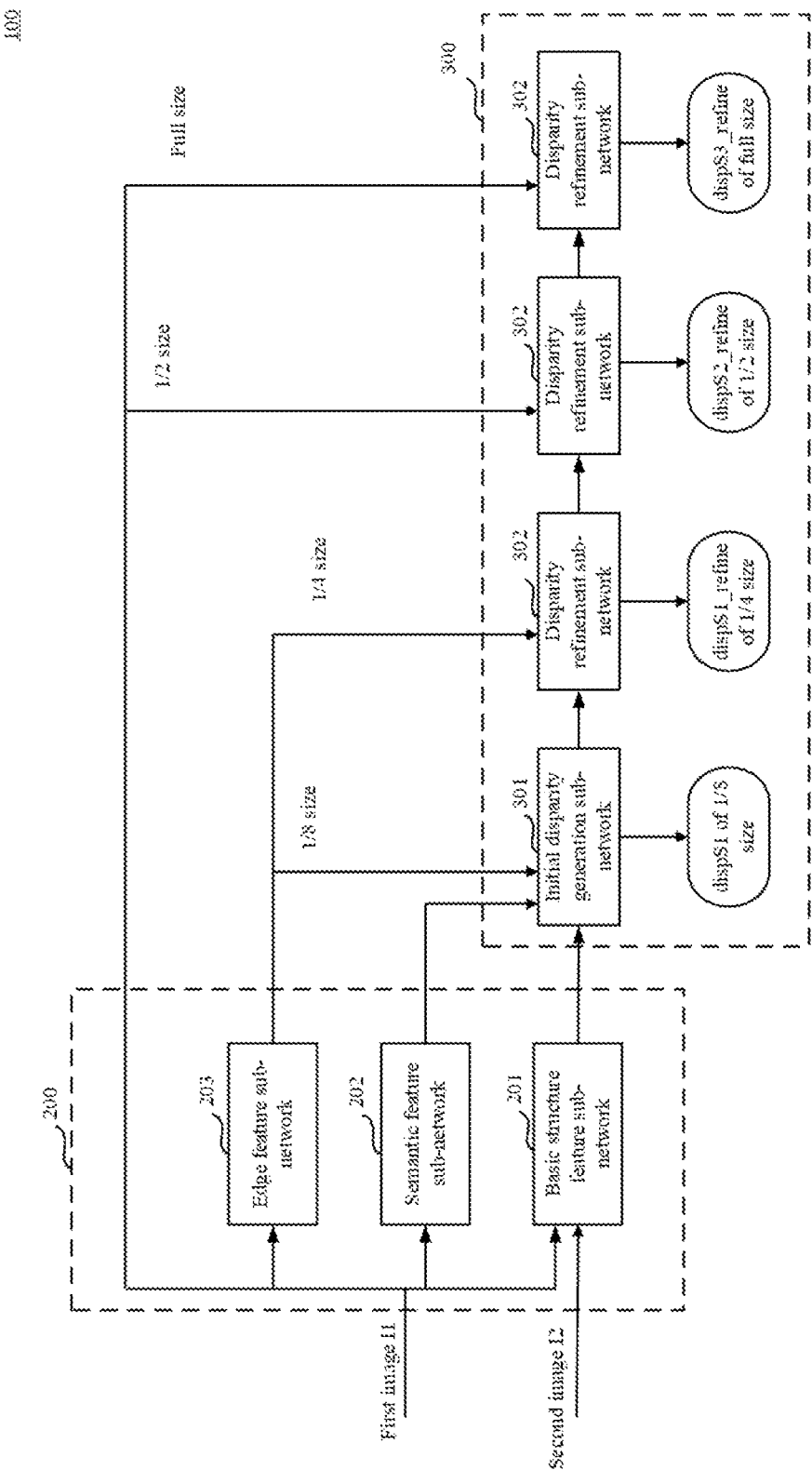
FIG. 6 is a block diagram illustrating another possible overall structure of a disparity estimation system according to exemplary embodiments of the present disclosure.

For example, according to some embodiments, as shown in FIG. 5 or FIG. 6, which are block diagrams illustrating a possible overall structure of the disparity estimation system 100 according to exemplary embodiments of the present disclosure. The feature extraction network 200 may include multiple feature extraction sub-networks respectively configured to extract different features of the image. The multiple feature extraction sub-networks may include at least a basic structure feature sub-network 201 configured to extract basic structure features of the image, a semantic feature sub-network 202 configured to extract semantic features of the image, and an edge feature sub-network 203 configured to extract edge features of the image.

According to some embodiments, the basic structure feature sub-network 201 may adopt any network that can be configured to extract basic structure features of the image, such as VGG (very deep convolutional networks for large-scale image recognition) or ResNet (Residual Network). The semantic feature sub-network 202 may adopt any network that can be configured to extract semantic features of the image, such as DeepLabV3+(an encoder-decoder with atrous separable convolution for semantic image segmentation). The edge feature sub-network 203 may adopt any network that can be configured to extract edge features of the image, such as a HED (holistically-nested edge detection) network. According to some implementations, the HED network may adopt the VGG as the backbone network, and when the edge feature sub-network 203 adopts the HED network, the basic structure feature sub-network 201 and the edge feature sub-network 203 may adopt the same VGG network, to simplify the structure of the feature extraction network.

According to some embodiments, the feature extraction network 200 or the feature extraction sub-networks included in the feature extraction network 200 may be an extraction network pre-trained based on a training sample set, such that the efficiency of image feature extraction can be improved, the efficiency of disparity estimation can be improved. Certainly, according to actual requirements, the feature extraction network 200 or the feature extraction sub-networks c included in the feature extraction network 200 may also be obtained by real-time training based on a training sample set, or obtained by refining the pre-trained extracted network in real time or periodically based on the updated training sample set, so as to improve the accuracy of features extracted by the feature extraction network.

According to some embodiments, the feature extraction network 200 or the feature extraction sub-networks included in the feature extraction network 200 may be trained with supervised training or unsupervised training, which may be flexibly selected according to actual requirements. Supervised training usually uses existing training samples (such as labeled data) to learn mapping from input to output, and then applies the mapping relationship to unknown data for classification or regression. Supervised training algorithms may include, for example, a logistic regression algorithm, a support vector machine (SVM) algorithm, a decision tree algorithm, etc. The difference between unsupervised training and supervised training lies in that unsupervised training does not require training samples, it directly models unlabeled data to find out the rules. Typical algorithms of unsupervised training may include a clustering algorithm, a random forest algorithm, etc.

According to some embodiments, as described above, the input of the first stage disparity processing in the multi-stage disparity processing may include multiple image features each having a size corresponding to the first stage disparity processing, and the input of disparity processing of each stage other than the first stage disparity processing of the multi-stage disparity processing may include one or more image features each having a size corresponding to the disparity processing of the stage. As an example, the multiple disparity maps obtained by the disparity generation network 300 are N disparity maps with successively increasing sizes, and the image features extracted by the feature extraction network 200 may include image features of N sizes, N may be a positive integer not less than 2. At least a part of the image feature of each size may be used to help generate the disparity map of the corresponding size, so as to improve the accuracy of the multiple disparity maps obtained by the disparity estimation system. According to some embodiments, N may be 4 (as shown in FIG. 5 or FIG. 6). In other examples, N may also be 2, 3, 5 or others according to actual requirements. In addition, N is not the greater the better, and N can be selected as a proper value on the premise that accuracy requirement of the target device and the speed of the disparity estimation system are balanced.

In the present disclosure, the size of each image (including each image in the image pair, the disparity map, etc.) may refer to the size of a single channel of each image, which can be represented by the height and width of the image. For example, the size of the image may be expressed as H×W, in which H is the height of the image, W is the width of the image, and the two may be in units of pixels. Certainly, this is merely an example. The size of the image may also be represented by one or more parameters that can reflect the number of pixels, the data amount, the storage amount, the definition of the image, and the like. In addition, it should be noted that for a grayscale image, the number of channels is 1, and for a color image, since it can have three color channels of R, G, and B, the number of channels can be 3. In other words, the actual size of the color image may be expressed as H×W×3. In addition, in the present disclosure, the size of each image in the image pair (i.e., the size of the original image that has not been downsampled and/or upsampled) may be determined according to parameters such as the size and number of pixels of sensors of the multiocular camera configured to capture the image pair.

In the present disclosure, the size corresponding to the disparity processing of each stage may be consistent with the size of the disparity map required to be obtained by the disparity processing of each stage. In addition, the size of the image feature may refer to the size of a single channel of the image formed by the image feature itself, or the size of an extracted image on which extraction of an image feature of a required size is based. The extracted image maybe any image in the image pair, or the image obtained by upsampling or downsampling the image with a certain coefficient or ratio. As an example, the size of the image in the image pair is H×W (which may be referred to as full size), the image feature of the full size extracted for the image may be the image feature obtained by performing feature extraction on the image itself, and the image feature of $$\frac{H}{2} \times \frac{W}{2}$$

size (which may be referred to as ½ size) extracted for the image may be the image feature obtained by performing 2 times downsampling on the image to obtain an image of ½ size and then performing feature extraction on the image of the ½ size.

According to some embodiments, in addition to one or more image features each having a size corresponding to the disparity processing of the stage, the input of disparity processing of each stage other than the first stage disparity processing of the multi-stage disparity processing may further include the disparity map generated by disparity processing of an immediate previous stage. In other words, based on the one or more image features each having the corresponding size, the disparity map generated by the first stage disparity processing may be refined stage by stage to obtain the disparity map of the corresponding size. Thereby, the accuracy of disparity maps subsequently obtained can be gradually improved, without the need to compute the disparity map from the beginning for each accuracy, such that overall generation efficiency of the multiple disparity maps can be improved.

According to some embodiments, the image feature of the minimum size in the image features of the N sizes extracted by the feature extraction network 200 may include, for example, at least one type of image feature of a first image and at least one type of image feature of a second image in the image pair, and the image feature of each non-minimum size in the image features of the N sizes may include, for example, at least one type of image feature of the first image and/or at least one type of image feature of the second image in the image pair.

For example, as shown in FIG. 5 or FIG. 6, the image feature of the minimum size in the image features of the N sizes extracted by the feature extraction network 200 may include the basic structure feature, the semantic feature and the edge feature of the first image (e.g., a left-view image) in the image pair, and the basic structure feature of the second image (e.g., a right-view image) in the image pair. The image feature of each non-minimum size in the image features of the N sizes extracted by the feature extraction network 200 may include the edge feature of the first image in the image pair or the image-self-based feature of the first image.

According to some embodiments, each type of image feature of each image extracted by the feature extraction network 200 may have one or more sizes, and the number of the multiple sizes may be less than or equal to N. For example, as shown in FIG. 5 or FIG. 6, N may be 4, the extracted edge feature and the image-self-based feature of the first image may have two sizes respectively, the extracted basic structure feature and semantic feature of the first image may have one size, and the extracted basic structure feature of the second image may have one size. In addition, FIG. 5 or FIG. 6 is merely an example. In addition to the one or two sizes illustrated, each type of image feature of each image extracted by the feature extraction network 200 may have more sizes. As an example, N is 4, and the edge feature of the first image extracted by the feature extraction network 200 may have three or four sizes, which is not limited.

According to some embodiments, after the feature extraction network 200 extracts the image feature of each image in the image pair, it may store (e.g., cache) the image features in a storage device or a storage medium for subsequent reading and use. In addition, before the feature extraction network 200 performs image feature extraction on the images in the image pair, it may further perform epipolar rectification on the images in the image pair, such that the images in the image pair have disparity in one direction (e.g., a horizontal direction or a vertical direction). Thus, the disparity search range of the image can be limited to one direction, thereby improving the efficiency of subsequent feature extraction and disparity generation. In some embodiments, the epipolar rectification operation on the images in the image pair may be performed by the multiocular camera or other third-party devices. For example, after the multiocular camera captures the image pair, it may perform epipolar rectification on the images in the image pair, and send the rectified image pair to the disparity estimation system. Alternatively, after the multiocular camera captures the image pair, it may send the image pair to other third-party devices, and the other third-party devices perform epipolar rectification on the images in the image pair, and send the rectified image pair to the disparity estimation system.

According to some embodiments, the size of the disparity map having a maximum size in the multiple disparity maps obtained by the disparity generation network 300 may be consistent with the size of each image in the image pair (i.e., the original size of each image). Therefore, through the cascaded multi-stage disparity processing, at least a disparity map having a corresponding size consistent with the size of each image in the image pair and having a relatively high accuracy, and a disparity map with another accuracy can be obtained, such that requirements of high-performance target devices for accuracy of the disparity map generated by the disparity estimation system can be met, while improving flexibility and the applicability of the disparity estimation system. As an alternative, the size of each disparity map in the multiple disparity maps may be less than the size of each image in the image pair.

According to some embodiments, in any two adjacent disparity maps of the multiple disparity maps, the height and width of the latter disparity map may be respectively twice the height and width of the previous disparity map. As an example, there are 4 disparity maps, and the size of the last disparity map in the 4 disparity maps is H×W (which may be consistent with the size of each image in the image pair), and then the size of other three disparity maps arranged before the last disparity map may be successively:

$$\frac{H}{2} \times \frac{W}{2}$$

(which may be referred to as ½ size if H×W size is referred to as full size), $$\frac{H}{4} \times \frac{W}{4}$$

(which may be referred to as ¼ size), and $$\frac{H}{8} \times \frac{W}{8}$$

(which may be referred to as ⅛ size). In other words, in the present disclosure, the value 2 is used as a scaling step for the height and width of the adjacent disparity maps (or the coefficient or ratio of upsampling or downsampling of the adjacent disparity maps). As an alternative, in any two adjacent disparity maps of the multiple disparity maps, the height and width of the latter disparity map may also be respectively 3 times, 4 times, or other times (e.g., a positive integer greater than 1, which may be selected according to the actual accuracy required) the height and width of the previous disparity map.

According to some embodiments, as described above, the image features extracted by the feature extraction network 200 may include image features of N sizes, and N is a positive integer not less than 2. Accordingly, the disparity generation network may be configured to: generate, in the first stage disparity processing of the multi-stage disparity processing, an initial disparity map having a minimum size according to at least a part of an image feature of the minimum size in the image features of the N sizes; and perform, in disparity processing of each subsequent stage of the multi-stage disparity processing, disparity refinement on a disparity map generated by disparity processing of an immediate previous stage according to at least a part of an image feature having a corresponding size in the image features of the N sizes, to generate a refined disparity map having the corresponding size. The multiple disparity maps may include at least each refined disparity map.

According to some embodiments, the multi-stage disparity processing may include disparity processing of N+1 stages. The disparity generation network may be configured to: successively perform, in disparity processing of N stages other than the first stage disparity processing, disparity refinement on the disparity map generated by disparity processing of an immediate previous stage, based on at least a part of an image feature having a corresponding size in the image features of the N sizes in ascending order of sizes, to obtain N refined disparity maps with successively increasing sizes; and take the N refined disparity maps as the multiple disparity maps. The sizes of the N refined disparity maps correspond to the N sizes, respectively.

For example, as shown in FIG. 5, the multi-stage disparity processing may include disparity processing of 4+1 stages. The extracted image features may include image features of 4 sizes.

As an example, in FIG. 5, the 4 sizes are ⅛ size $$\left(\frac{H}{8} \times \frac{W}{8}\right),$$

¼ size $$\left(\frac{H}{4} \times \frac{W}{4}\right),$$

½ size $$\left(\frac{H}{2} \times \frac{W}{2}\right),$$

and full size (H×W, which may refer to a size consistent with the size of the original image in the image pair), respectively. The disparity generation network may be configured to: generate, in the first stage disparity processing of the multi-stage disparity processing, an initial disparity map having the minimum size (i.e., ⅛ size) according to at least a part of the image feature of the minimum size (e.g., part or all of the basic structure feature of ⅛ size, the semantic feature of ⅛ size and the edge feature of ⅛ size of the first image, and basic structure feature of ⅛ size of the second image) in the image features of the 4 sizes; and successively perform, in disparity processing of 4 stages other than the first stage disparity processing, disparity refinement on the disparity map generated by disparity processing of an immediate previous stage based on at least a part of the image feature having a corresponding size in the image features of the 4 sizes in ascending order of sizes (e.g., successively based on part or all of the edge feature of ⅛ size of the first image, part or all of the edge feature of ¼ size of the first image, the image-self-based feature of ½ size of the first image, and the image-self-based feature of full size of the first image), to obtain 4 refined disparity maps with successively increasing sizes (e.g., the refined disparity map of ⅛ size, the refined disparity map of ¼ size, the refined disparity map of ½ size, and the refined disparity map of full size). The 4 refined disparity maps may be used as the multiple disparity maps.

As can be seen from the above description, the multiple disparity maps obtained by the disparity estimation system 100 do not include the initial disparity map generated by the first stage disparity processing, but include the refined disparity maps obtained by successively refining the initial disparity map. Thereby, the accuracy of the multiple disparity maps obtained by the disparity estimation system can be improved.

According to some other embodiments, the multi-stage disparity processing may include disparity processing of N stages. The disparity generation network may be configured to: successively perform, in disparity processing of N−1 stages other than the first stage disparity processing, disparity refinement on a disparity map generated by disparity processing of an immediate previous stage based on at least a part of an image feature having a corresponding size in image features of N−1 non-minimum sizes of the image features of the N sizes in ascending order of sizes, to obtain N−1 refined disparity maps with successively increasing sizes; and take the initial disparity map and the N−1 refined disparity maps as the multiple disparity maps. The sizes of the initial disparity map and the N−1 refined disparity maps correspond to the N sizes, respectively.

For example, as shown in FIG. 6, the multi-stage disparity processing may include disparity processing of 4 stages. The extracted image features may include image features of 4 sizes. As an example, in FIG. 6, the 4 sizes are ⅛ size $$\left(\frac{H}{8} \times \frac{W}{8}\right),$$

¼ size $$\left(\frac{H}{4} \times \frac{W}{4}\right),$$

½ size $$\left(\frac{H}{2} \times \frac{W}{2}\right),$$

and full size (H×W, which may refer to a size consistent with the size of each image in the image pair), respectively. The disparity generation network may be configured to: gener- ate, in the first stage disparity processing of the multi-stage disparity processing, an initial disparity map having a mini- mum size (i.e., ⅛ size) according to at least a part of the image feature of the minimum size (e.g., part or all of the basic structure feature of ⅛ size, the semantic feature of ⅛ size and the edge feature of ⅛ size of the first image, and basic structure feature of ⅛ size of the second image) in the image features of the 4 sizes; and successively perform, in disparity processing of 3 stages other than the first stage disparity processing, disparity refinement on the disparity map generated by disparity processing of an immediate previous stage based on at least a part of the image feature having a corresponding size in image features of other 3 non-minimum sizes in ascending order of sizes (e.g., suc- cessively based on part or all of the edge feature of ¼ size of the first image, the image-self-based feature of ½ size of the first image, and the image-self-based feature of full size of the first image), to obtain 3 refined disparity maps with successively increasing sizes (e.g., the refined disparity map of ¼ size, the refined disparity map of ½ size, and the refined disparity map of full size). The initial disparity map and the 3 refined disparity maps may be used as the multiple disparity maps.

As can be seen from the above description, the multiple disparity maps obtained by the disparity estimation system 100 includes the initial disparity map generated by the first stage disparity processing of the multi-stage disparity pro- cessing, such that the processing efficiency of the disparity estimation system can be improved.

According to some embodiments, the disparity generation network 300 may be configured to: perform, in disparity processing of each stage other than the first stage disparity processing of the multi-stage disparity processing, residual computation on the disparity map generated by disparity processing of an immediate previous stage based on at least part of an image feature having a corresponding size, to obtain a residual map having the corresponding size; and combine the residual map having the corresponding size with the disparity map generated by disparity processing of the immediate previous stage to obtain a refined disparity map having the corresponding size.

For example, as shown in FIG. 5, in disparity processing corresponding to ⅛ size of disparity processing of 4 stages other than the first stage disparity processing, a first residual map of ⅛ size may be computed based on part or all of the extracted edge feature of ⅛ size of the first image and the initial disparity map (of ⅛ size) generated by disparity processing of the immediate previous stage, and the first residual map is combined (e.g., added) with the initial disparity map, to obtain a first refined disparity map of ⅛ size as output of disparity processing of the stage. In next stage disparity processing corresponding to the ¼ size, a second residual map of ¼ size may be computed based on part or all of the extracted edge feature of ¼ size of the first image and the first refined disparity map (of ⅛ size) gen- erated by disparity processing of the immediate previous stage, and the second residual map is combined with the first refined disparity map (e.g., the second residual map is added to an upsampled version of ¼ size of the first refined disparity map), to obtain a second refined disparity map of ¼ size as output of disparity processing of the stage, and so on. More specific examples will be discussed below.

According to some embodiments, the disparity generation network 300 may further be configured to: upsample, in disparity processing of each stage other than the first stage disparity processing of the multi-stage disparity processing and before disparity refinement is performed on a disparity map generated by disparity processing of an immediate previous stage, the disparity map generated by disparity processing of the immediate previous stage to the size corresponding to the current stage disparity processing, in response to a size of the disparity map generated by disparity processing of the immediate previous stage being less than a size corresponding to a current stage disparity processing. The algorithm adopted for upsampling may include, for example, a nearest-neighbor interpolation algorithm, a bilinear interpolation algorithm, a deconvolution algorithm, etc. In this way, the disparity map adopted in disparity refinement of each stage may be the disparity map having the size corresponding to the disparity processing of the stage.

For example, as shown in FIG. 5, in disparity processing corresponding to ⅛ size of disparity processing of 4 stages other than the first stage disparity processing, since the size of the initial disparity map generated by disparity processing of the immediate previous stage is not less than that of the current stage disparity processing, based on part or all of the extracted edge feature of ⅛ size of the first image, disparity refinement can be performed on the initial disparity map generated to obtain the first refined disparity map of ⅛ size. In next stage disparity processing corresponding to ¼ size, the first refined disparity map of ⅛ size generated by disparity processing of the immediate previous stage may be upsampled to ¼ size corresponding to the current stage disparity processing, and then based on part or all of the extracted edge feature of ¼ size of the first image, disparity refinement may be performed on the upsampled first refined disparity map of ¼ size to obtain the second refined disparity map of ¼ size. For example, as described above, in next stage disparity processing corresponding to the ¼ size, based on part or all of the extracted edge feature of ¼ size of the first image and the upsampled first refined disparity map of ¼ size, the residual map of ¼ size may be computed, and the residual map of the ¼ size can be added to the upsampled first refined disparity map of the ¼ size to obtain the second refined disparity map of ¼ size, and so on.

According to some embodiments, image features based on which different refined disparity maps are generated may be image features of the same type or image features of different types. In some other embodiments, the image features based on which different refined disparity maps are generated may be image features of the same image or different images in the image pair. For example, as shown in FIG. 5, image features based on which the first two different refined disparity maps are generated may be image features of the same type (e.g., edge features) of the same image (e.g., the first image) in the image pair, and image features based on which the two intermediate different refined disparity maps are generated may be image features of different types (e.g., the edge feature of the first image, and image-self-based feature of the first image) of the same image (e.g., the first image), and so on. Thereby, flexibility and applicability of the disparity estimation system can be improved by flexibly selecting the image features on which disparity refinement of each stage is based.

According to some embodiments, the image feature based on which each refined disparity map is generated may include, for example, the edge feature of at least one image in the image pair and/or the image-self-based feature of at least one image in the image pair.

For example, as shown in FIG. 5, in disparity refinement of the first two stages corresponding to a smaller size other than the first stage disparity processing of the multi-stage disparity processing, a refined disparity map of the corresponding size can be generated based on the edge feature of the first image. In disparity refinement of the last two stages corresponding to a larger size, disparity refinement may be performed on the disparity map generated by disparity processing of the immediate previous stage by using the image-self-based feature of the first image instead of the edge feature, so as to reduce the amount of computation required for feature extraction of large-size images and improve the processing efficiency of the disparity estimation system. Certainly, FIG. 5 is merely an example. For each disparity refinement, in addition to the edge feature or the image-self-based feature, the image features based on which the corresponding refined disparity map is generated may also be a combination of the two, or a combination of the other extracted one or more image features, and the like.

According to some embodiments, the image-self-based feature of the at least one image in the image pair may include, for example, the at least one image itself, or the image obtained by downsampling the at least one image itself according to the size of the refined disparity map to be generated. The downsampling process may include the following operations. For example, for an image with a size of H×W, in the case that the downsampling coefficient or ratio is K, a point may be selected every K points in each row and each column of the original image to form an image. The downsampling coefficient or ratio may be 2, 3 or other values greater than 1. Certainly, this is merely an example, and downsampling may also be implemented in other manners, for example, averaging of K points.

As shown in FIG. 5, in disparity refinement of last two stages corresponding to ½ size and full size of the multi-stage disparity processing, disparity refinement may be performed on the disparity map generated by disparity processing of the immediate previous stage by using the first image of ½ size and the first image itself instead of the edge feature of the corresponding size, the first image of ½ size is obtained by downsampling the first image itself based on a downsampling coefficient of 2, so as to reduce the amount of computation required for feature extraction of large-size images and improve the processing efficiency of the disparity estimation system.

According to some embodiments, as shown in FIG. 5 or FIG. 6, the disparity generation network 300 may include an initial disparity generation sub-network 301 and at least one disparity refinement sub-network 302. The initial disparity generation sub-network 301 and each of the at least one disparity refinement sub-network 302 are successively cascaded. The initial disparity generation sub-network 301 is configured to perform the first stage disparity processing, and the at least one disparity refinement sub-network 302 is configured to perform disparity processing of the stages other than the first stage disparity processing.

In combination with the above embodiments, it can be learned that the image feature extraction and disparity processing of each stage of the disparity estimation system 100 can be implemented by a corresponding sub-network.

For example, FIG. 5 is used as an example below for illustrative description of the operating process of the disparity estimation system 100 including multiple feature extraction sub-networks (such as the basic structure feature sub-network 201, the semantic feature sub-network 202, and the edge feature sub-network 203), the initial disparity generation sub-network 301, and multiple (e.g., four) disparity refinement sub-networks 302.

As can be seen from FIG. 5, for the first image I1 and the second image I2 (the sizes are H×W, respectively) in the image pair input to the disparity estimation system 100, the disparity estimation system 100 may extract image features of the size required for subsequent multi-stage disparity processing on the first image I1 and the second image I2, based on the multiple feature extraction sub-networks in the feature extraction network 200. For example, the basic structure $$\left(\frac{H}{8} \times \frac{W}{8}\right)$$

feature of ⅛ size of the first image I1 and the basic structure feature of ⅛ size of the second image I2 may be extracted based on the basic structure feature sub-network 201, the semantic feature of ⅛ size of the first image I1 may be extracted based on the semantic feature sub-network 202, and the edge feature of ⅛ size and the edge feature of ¼ size $$\left(\frac{H}{4} \times \frac{W}{4}\right)$$

or me first image I1 may be extracted based on the edge feature sub-network 203. In addition, in addition to the above image features, the feature extraction network 200 of the disparity estimation system 100 may further extract the image-self-based feature of ½ size $$\left(\frac{H}{2} \times \frac{W}{2}\right)$$

and the image-self-based feature of full size (H×W) (i.e., the first image I1 itself).

The basic structure feature of ⅛ size of the first image I1, the basic structure feature of ⅛ size of the second image I2, the semantic feature of ⅛ size of the first image I1, and the edge feature of ⅛ size of the first image I1 may be output by the corresponding feature extraction sub-network to the initial disparity generation sub-network 301 for the first stage disparity processing, to obtain the initial disparity map dispS1 of ⅛ size. Then, based on the image features with corresponding sizes extracted by the feature extraction network 200, the four disparity refinement sub-networks 302 successively cascaded with the initial disparity generation sub-network 301 may successively perform disparity refinement of different stages on the initial disparity map dispS1 respectively, so as to obtain multiple refined disparity maps with successively increasing sizes.

For example, the first disparity refinement sub-network may perform disparity refinement on the initial disparity map dispS1 of ⅛ size output by the initial disparity generation sub-network 301 based on (part or all of) the edge feature of ⅛ size of the first image I1 from the edge feature sub-network 203, to obtain a first refined disparity map dispS1_refine of ⅛ size. According to some embodiments, the first disparity refinement sub-network may obtain a first residual map of ⅛ size based on (part or all of) the edge feature of ⅛ size of the first image I1 and the initial disparity map dispS1 of ⅛ size, and add the first residual map of the ⅛ size to the initial disparity map dispS1 of the ⅛ size to obtain the first refined disparity map dispS1_refine of the ⅛ size.

The second disparity refinement sub-network may perform disparity refinement on the first refined disparity map dispS1_refine of the ⅛ size output by the first disparity refinement sub-network based on (part or all of) the edge feature of ¼ size of the first image I1 from the edge feature sub-network 203, to obtain a second refined disparity map dispS2_refine of ¼ size. According to some embodiments, the second disparity refinement sub-network may upsample the first refined disparity map of the ⅛ size output by the first disparity refinement sub-network to ¼ size corresponding to the current stage disparity processing, and obtain the second residual map of ¼ size based on (part or all of) the edge feature of ¼ size of the first image I1 and the upsampled first refined disparity map of ¼ size, and add the second residual map of the ¼ size to the upsampled first refined disparity map of the ¼ size to obtain the second refined disparity map dispS2_refine of the ¼ size.

The third disparity refinement sub-network may perform disparity refinement on the second refined disparity map dispS2_refine of the ¼ size output by the second disparity refinement sub-network based on (part or all of) the image-self-based feature of ½ size of the first image I1 extracted by the feature extraction network 200, to obtain a third refined disparity map dispS3_refine of ½ size. According to some embodiments, the third disparity refinement sub-network may upsample the second refined disparity map of the ¼ size output by the second disparity refinement sub-network to ½ size corresponding to the current stage disparity processing, and obtain a third residual map of ½ size based on (part or all of) the image-self-based feature of ½ size of the first image and the upsampled second refined disparity map of ½ size, and add the third residual map of the ½ size to the upsampled second refilled disparity map of the ½ size to obtain the third refined disparity map dispS3_refine of the ½ size.

The fourth disparity refinement sub-network may perform disparity refinement on the third refined disparity map dispS3_refine of the ½ size output by the third disparity refinement sub-network based on (part or all of) the image-self-based feature of full size of the first image I1 extracted by the feature extraction network 200, to obtain a fourth refined disparity map dispS4_refine of full size. According to some embodiments, the fourth disparity refinement sub-network may upsample the third refined disparity map of the ½ size output by the third disparity refinement sub-network to full size corresponding to the current stage disparity processing, obtain a fourth residual map of full size based on (part or all of) the image-self-based feature of full size of the first image and the upsampled third refined disparity map of full size, and add the fourth residual map of the full size to the upsampled third refined disparity map of the full size to obtain the fourth refined disparity map dispS4_refine of the full size. It should be noted that, in this example, the third and the fourth disparity refinement sub-networks perform disparity refinement using the image-self-based feature of the first image, such that the amount of computation is reduced. However, one or both of them may also use the edge feature or other features of the first image. Similarly, the first disparity refinement sub-network and/or the second disparity refinement sub-network may also use the image-self-based feature of the first image instead of the edge feature, so as to further reduce the amount of computation, which is not limited in the present disclosure.

The first refined disparity map dispS1_refine of the ⅛ size, the second refined disparity map dispS2_refine of the ¼ size, the third refined disparity map dispS3_refine of the ½ size, and the fourth refined disparity map dispS4_refine of the full size may be used as the multiple disparity maps with successively increasing sizes obtained by the disparity estimation system 100 shown in FIG. 5.

In addition, the operating process of the disparity estimation system 100 shown in FIG. 6 is similar to the operating process of the disparity estimation system 100 shown in FIG. 5, except that the size of the initial disparity map generated by the initial disparity generation sub-network 301 is less than the size of the refined disparity map generated by the first disparity refinement sub-network, and that the initial disparity map generated by the initial disparity generation sub-network 301 is used as one of the multiple disparity maps with successively increasing sizes obtained by the disparity estimation system 100, and details are not described herein.

According to some embodiments, the initial disparity generation sub-network 301 and each of the at least one disparity refinement sub-network 302 may be any convolutional neural network that can implement corresponding disparity processing functions such as a two-dimensional deep convolutional neural network (2DCNN) or a three-dimensional deep convolutional neural network (3DCNN). By using the convolutional neural network as the disparity processing sub-network, a larger receptive field can be obtained, such that the accuracy of the disparity map obtained by the disparity estimation system can be improved.

According to some embodiments, for the initial disparity generation sub-network 301, when it adopts a 2DCNN structure for obtaining the disparity, the initial disparity generation sub-network 301 may include a first number of convolutional layers successively cascaded (e.g., 5 convolutional layers, which may also select other numbers according to actual requirements). The convolution manner of each convolutional layer may adopt, for example, depthwise separable convolution.

For example, an initial disparity generation sub-network 301 will be illustrated below by using Table 1, the initial disparity generation sub-network 301 may be applied to the disparity estimation system shown in FIG. 5, and adopt the 2DCNN structure including 5 convolutional layers successively cascaded (e.g., conv1 to conv5 in Table 1). As an example, the initial disparity generation sub-network 301 adopts a MobileNetV2 network architecture.

TABLE 1 related description of a 2DCNN network structure of the initial disparity generation sub-network 301

| Name | Layer Description | Output Tensor Dim |
|---|---|---|
| corr1d | correlation layer | ⅛H × ⅛W × ⅛D |
| semanS1_conv | from semantic feature: conv 3 × 3, ⅛D features, | ⅛H × ⅛W × ⅛D |
| edgeS1_conv | from edge feature: conv 3 × 3, ⅛D features, | ⅛H × ⅛W × ⅛D |
| concat | concat (corr1d, semanS1_conv, dgeS1_conv) | ⅛H × ⅛W × ⅜D |
| conv1 | MB_conv, ⅜D features | ⅛H × ⅛W × ⅜D |
| conv2 | MB_conv, ⅖D features | ⅛H × ⅛W × ⅖D |
| conv3 | MB_conv_res, ⅖D features | ⅛H × ⅛W × ⅖D |
| conv4 | MB_conv, ⅛D features | ⅛H × ⅛W × ⅛D |
| conv5 | MB_conv_res, ⅛D features | ⅛H × ⅛W × ⅛D |
| dispS1 | soft argmin | ⅛H × ⅛W × 1 |

As can be seen from Table 1 and FIG. 5, the corr1d layer may be configured to perform corresponding operations on the basic structure feature of ⅛ size of the first image and the basic structure feature of ⅛ size of the second image extracted by the feature extraction network 200 in FIG. 5. The semanS1_conv layer may be configured to perform convolution processing on the semantic feature of ⅛ size of the first image based on a 3×3 convolution kernel. The edgeS1_conv layer may be configured to perform convolution processing on the edge feature of ⅛ size of the first image based on a 3×3 convolution kernel. The concat layer may be configured to combine the features output by the corr1d layer, the semanS1_conv layer, and the edgeS1_conv layer.

In addition, the MB_conv operation involved in the conv1 to conv5 layers may be the depthwise separable convolution operation in MobileNetV2, and the MB_conv_res operation refers to the residual depthwise separable convolution operation in MobileNetV2. In other words, the conv1 layer, the conv2 layer, and the conv4 layer may be respectively configured to perform a depthwise separable convolution operation on the feature output by the previous layer, and the conv3 layer and the conv5 layer may be respectively configured to perform a residual depthwise separable convolution operation on the feature output by the previous layer. In addition, the dispS1 layer may be configured to perform soft argmin computation on the feature output by the previous layer, to obtain the initial disparity map dispS1 of the corresponding size (i.e., the ⅛ size).

It should be noted that, H and W in Table 1 may represent the height and width of the image in the image pair input to the disparity estimation system 100 respectively, and D may represent the maximum disparity range of the image. The unit of H, W and D may be pixels. The value of D may be related to the focal length of each lens and/or the spacing between the lenses in the multiocular camera configured to capture the image pair. In addition, the number of convolutional layers of the initial disparity generation sub-network 301 adopting the 2DCNN structure may be determined according to the number of features obtained by the concat layer. For example, when the number of features obtained by the concat layer is large, the number of convolutional layers included in the initial disparity generation sub-network 301 may also be increased.

As an alternative, the initial disparity generation sub-network 301 may also adopt a 3DCNN structure for obtaining the disparity. The initial disparity generation sub-network 301 adopting the 3DCNN structure may include a second number of convolutional layers successively cascaded (e.g., 7 convolutional layers, which may also be other numbers according to actual requirements).

For example, an initial disparity generation sub-network 301 will be illustrated below by using Table 2, the initial disparity generation sub-network 301 may be applied to the disparity estimation system shown in FIG. 5, and adopt the 3DCNN structure including 7 convolutional layers successively cascaded (e.g., conv1 to conv7 in Table 2)

TABLE 2 related description of a 3DCNN network structure of the initial disparity generation sub-network 301

| Name | Layer Description | Output Tensor Dim |
|---|---|---|
| edgeS1_conv | from edge feature: conv 3 × 3, F features | ⅛H × ⅛W × F |
| semanS1_conv | from semantic feature: conv 3 × 3, F features | ⅛H × ⅛W × F |
| concat | concat (featS1, semanS1_conv, edgeS1_conv) | ⅛H × ⅛W × 3F |
| cost | shift concatenate layer | ⅛D × ⅛H × ⅛W × 6F |
| conv1 | 3DCNN, 3 × 3 × 3, 4F features | ⅛D × ⅛H × ⅛W × 4F |

TABLE 2-continued related description of a 3DCNN network structure of
the initial disparity generation sub-network 301

| Name | Layer Description | Output Tensor Dim |
|---|---|---|
| conv2 | 3DCNN, 3 × 3 × 3, 4F features, add conv1 | ⅛D × ⅛H × ⅛W × 4F |
| conv3 | 3DCNN, 3 × 3 × 3, 2F features | ⅛D × ⅛H × ⅛W × 2F |
| conv4 | 3DCNN, 3 × 3 × 3, 2F features, add conv3 | ⅛D × ⅛H × ⅛W × 2F |
| conv5 | 3DCNN, 3 × 3 × 3, 1F features | ⅛D × ⅛H × ⅛W × 1F |
| conv6 | 3DCNN, 3 × 3 × 3, 2F features, add conv5 | ⅛D × ⅛H × ⅛W × 1F |
| conv7 | 3DCNN, 3 × 3 × 3, 1F features | ⅛D × ⅛H × ⅛W × 1 |
| dispS1 | soft argmin | ⅛H × ⅛W × 1 |

As can be seen from Table 2 and FIG. 5, the edgeS1_conv layer may be configured to perform convolution processing on the extracted edge feature of ⅛ size of the first image based on the 3×3 convolution kernel. The semanS3_conv layer may be configured to perform convolution processing on the extracted semantic feature of ⅛ size of the first image based on the 3×3 convolution kernel. The concat layer may be configured to combine the features output by the featS1 layer, the semanS1_conv layer, and the edgeS1_conv layer. Although not shown in Table 2, featS1 may refer to the extracted basic structure feature of ⅛ size of the first image and the extracted basic structure feature of ⅛ size of the second image.

In addition, the cost layer may be configured to shift features output by the concat layer. The conv1 layer to the conv7 layer may be respectively configured to perform the convolution operation on the feature output by the previous layer, based on the 3×3×3 convolution kernel. The conv2 layer, the conv4 layer, and the conv6 layer may be a residual module of the 3DCNN network. The conv2 layer, the conv4 layer, and the conv6 layer may be configured to perform the convolution operation on the feature output by the previous layer, and add the convolution result to the result output by the previous layer. The dispS1 layer may be configured to perform soft argmin computation on the feature output by the previous layer, to obtain the initial disparity map dispS1 of the corresponding size (i.e., the ⅛ size).

Similar to Table 1, H and W in Table 2 may represent the height and width of the image in the image pair input to the disparity estimation system 100, respectively. In addition, F may represent the number of feature channels, 1F represents that the number of channels is F, and 3F represents that the number of channels 3×F, and so on. Moreover, the number of convolutional layers of the initial disparity generation sub-network 301 adopting the 3DCNN structure may be determined according to the number of features obtained by the concat layer. For example, when the number of features obtained by the concat layer is large, the number of convolutional layers included in the initial disparity generation sub-network 301 may also be increased.

According to some embodiments, the number of convolutional layers included in each of the at least one disparity refinement sub-network 302 may be less than the number of convolutional layers included in the initial disparity generation sub-network 301. For example, for each disparity refinement sub-network 302 adopting the 2DCNN structure, the number of convolutional layers included in each disparity refinement sub-network 302 may be 3, and may alternatively be set to other values according to actual requirements. In addition, referring to the related description in the above embodiments, each disparity refinement sub-network 302 may also adopt the 3DCNN structure, which is not limited.

The structure of the multiple disparity refinement sub-networks 302 applicable to the disparity estimation system shown in FIG. 5 will be illustrated by using Table 3 to Table 6 below. Table 3 to Table 6 successively describe the 2DCNN network structures of the first to fourth disparity refinement sub-networks of the disparity estimation system shown in FIG. 5.

TABLE 3 related description of a 2DCNN network structure
of the first disparity refinement sub-network

| Name | Layer Description | Output Tensor Dim |
|---|---|---|
| edgeS1_conv | from edge feature: conv 3 × 3, 8 features | ⅛H × ⅛W × 8 |
| concat | concat (dispS1, edgeS1_conv) | ⅛H × ⅛W × 9 |
| conv1 | MB_conv, 4 features | ⅛H × ⅛W × 4 |
| conv2 | MB_conv_res, 4 features | ⅛H × ⅛W × 4 |
| conv3 | MB_conv, 1 features | ⅛H × ⅛W × 1 |
| dispS1_refine | add(dispS1, conv3) | ⅛H × ⅛W × 1 |

Similar to the above Table 1, the edgeS1_conv layer may be configured to perform convolution processing on the extracted edge feature of ⅛ size of the first image based on the 3×3 convolution kernel. The concat layer may be configured to combine the initial disparity map dispS1 of ⅛ size generated by disparity processing of the immediate previous stage (i.e., the initial disparity generation processing) and the feature output by the edgeS1_conv layer.

Moreover, the conv1 layer and the conv3 layer may be respectively configured to perform the depthwise separable convolution operation on the feature output by the previous layer, and the conv2 layer may be configured to perform the residual depthwise separable convolution operation on the feature output by the previous layer. In addition, the dispS1_refine layer may be configured to perform superimposition computation on the feature output by the previous layer (i.e., the conv3 layer) and the initial disparity map dispS1 of the ⅛ size generated by disparity processing of the immediate previous stage, to obtain the first refined disparity map dispS1_refine of the corresponding size (i.e., the ⅛ size).

TABLE 4 related description of a possible 2DCNN network structure
of the second disparity refinement sub-network

| Name | Layer Description | Output Tensor Dim |
|---|---|---|
| dispS1_up | upsample(dispS1_refine) | ¼H × ¼W × 1 |
| edgeS2_conv | from edge feature: conv 3 × 3, 8 features | ¼H × ¼W × 8 |
| concat | concat (dispS1_up, edgeS2_conv) | ¼H × ¼W × 9 |
| conv1 | MB_conv, 4 features | ¼H × ¼W × 4 |
| conv2 | MB_conv_res, 4 features | ¼H × ¼W × 4 |
| conv3 | MB_conv, 1 features | ¼H × ¼W × 1 |
| dispS2_refine | add (dispS1_up, conv3) | ¼H × ¼W × 1 |

As can be seen from Table 4 and FIG. 5, the dispS1_up layer may be configured to upsample the first refined disparity map dispS1_refine of the ⅛ size generated by disparity processing of the immediate previous stage (i.e., the first stage disparity refinement) to obtain the refined disparity map dispS1_up of ¼ size. The edgeS2_conv layer may be configured to perform convolution processing on the extracted edge feature of ¼ size of the first image based on the 3×3 convolution kernel. The concat layer may be configured to combine the upsampled refined disparity map dispS1_up of the ¼ size and the feature output by the edgeS2_conv layer.

Moreover, the conv1 layer and the conv3 layer may be respectively configured to perform the depthwise separable convolution operation on the feature output by the previous layer, and the conv2 layer may be configured to perform the residual depthwise separable convolution operation on the feature output by the previous layer. In addition, the dispS2_refine layer may be configured to perform an addition operation on the feature output by the previous layer (i.e., the conv3 layer) and the upsampled refined disparity map dispS1_up of the ¼ size, to obtain the second refined disparity map dispS2_refine of the corresponding size (i.e., the ¼ size).

TABLE 5 related description of a possible 2DCNN network structure of the third disparity refinement sub-network

| Name | Layer Description | Output Tensor Dim |
|---|---|---|
| dispS2_up | upsample(dispS2_refine) | ½H × ½W × 1 |
| imgS3 | downsample(I1) | ½H × ½W × 3 |
| concat | concat (dispS2_up, imgS3) | ½H × ½W × 4 |
| conv1 | conv 3 × 3, 4 features | ½H × ½W × 4 |
| conv2 | conv 3 × 3, 2 features | ½H × ½W × 2 |
| conv3 | conv 3 × 3, 1 features | ½H × ½W × 1 |
| dispS3_refine | add(dispS2_up, conv3) | ½H × ½W × 1 |

As can be seen from Table 5 and FIG. 5, the dispS2_up layer may be configured to upsample the second refined disparity map dispS2_refine of the ¼ size generated by disparity processing of the immediate previous stage (i.e., the second stage disparity refinement) to obtain the refined disparity map dispS2_up of ½ size. The imgS3 layer may be configured to downsample the first image itself to obtain the image-self-based feature of ½ size of the first image. In Table 5, I1 represents the first image. The concat layer may be configured to combine the upsampled refined disparity map dispS2_up of ½ size and the feature output by the imgS3 layer.

Moreover, each of the conv1 layer, the conv2 layer, and the conv3 layer may be configured to perform the convolution operation on the feature output by its previous layer, respectively. The dispS3_refine layer may be configured to perform an addition operation on the feature output by the previous layer (i.e., the conv3 layer) and the upsampled refined disparity map dispS2_up of the ½ size, to obtain the third refined disparity map dispS3_refine of the corresponding size (i.e., ½ size).

TABLE 6 related description of a possible 2DCNN network structure of the fourth disparity refinement sub-network

| Name | Layer Description | Output Tensor Dim |
|---|---|---|
| dispS3_up | upsample(dispS3_refine) | H × W × 1 |
| concat | concat (dispS3_up, I1) | H × W × 4 |
| conv1 | conv 3 × 3, 4 features | H × W × 4 |
| conv2 | conv 3 × 3, 2 features | H × W × 2 |
| conv3 | conv 3 × 3, 1 features | H × W × 1 |
| dispS4_refine | add(dispS3_up, conv3) | H × W × 1 |

As can be seen from Table 6 and FIG. 5, the dispS3_up layer may be configured to upsample the third refined disparity map dispS3_refine of the ½ size generated by disparity processing of the immediate previous stage (i.e., the third stage disparity refinement) to obtain the refined disparity map dispS3_up of full size. The concat layer may be configured to combine the upsampled refined disparity map dispS3_up of the full size and the first image itself. In Table 6, I1 represents the first image.

Moreover, each of the conv1 layer, the conv2 layer and the conv3 layer may be configured to perform the convolution operation on the feature output by its previous layer, respectively. The dispS4_refine layer may be configured to perform an addition operation on the feature output by the previous layer (i.e., the conv3 layer) and the upsampled refined disparity map dispS3_up of the full size, to obtain the fourth refined disparity map dispS4_refine of the corresponding size (i.e., the full size).

It should be noted that, similar to the above embodiments, H and W in Tables 3-6 may respectively represent the height and width of the image in the image pair input to the disparity estimation system 100. In addition, the number of convolutional layers of each disparity refinement sub-network 302 adopting the 2DCNN structure may be determined according to the number of features obtained by the concat layer. For example, when the number of features obtained by the concat layer is large, the number of convolutional layers included in each disparity refinement sub-network 302 may also be increased.

According to some embodiments, each sub-network of the initial disparity generation sub-network 301 and the at least one disparity refinement sub-network 302 may be pre-trained based on a training sample set, such that the efficiency of disparity processing can be improved. Certainly, according to actual requirements, each sub-network of the initial disparity generation sub-network 301 and the at least one disparity refinement sub-network 302 may be obtained by real-time training based on a training sample set, or obtained by refining pre-trained network in real time or periodically based on the updated training sample set, so as to improve the accuracy of disparity generation.

According to some embodiments, each sub-network of the initial disparity generation sub-network 301 and the at least one disparity refinement sub-network 302 may be trained with supervised training or unsupervised training, which may be flexibly selected according to actual requirements. For the description of the supervised training and unsupervised training, reference may be made to the relevant descriptions in the above embodiments, and details are not described herein again.

According to some embodiments, each sub-network of the initial disparity generation sub-network 301 and the at least one disparity refinement sub-network 302 may be configured to compute a loss function. The loss function may represent an error between a disparity in a disparity map generated by the sub-network and a corresponding real disparity. In this way, by computing the loss function, the accuracy of each disparity map generated by the disparity estimation system can be determined. In addition, the corresponding system may be refined based on the loss function.

According to some embodiments, as an example, each sub-network of the initial disparity generation sub-network 301 and the at least one disparity refinement sub-network 302 is trained with supervised training, the loss function output by each disparity processing sub-network or disparity processing of each stage may be defined as $L_n = f(Disp^{GTn} -$ Disp$^{Sn}$) g(Disp$^{Sn}$), where n=1 to N (corresponding to the disparity estimation system shown in FIG. 5), or n=0 to N (corresponding to the disparity estimation system shown in FIG. 6). The function f represents the difference between the estimated disparity (Disp$^{Sn}$) and the real disparity (Disp$^{GTn}$), and the function g represents the disparity continuity constraint.

$$f(x) = \sqrt{\left(\frac{x}{2}\right)^2 + 1} - 1,$$

and g(x)=|x$_x$|+|x$_y$|. In addition, the edge feature may also be taken as a regular term of the loss function, which is not limited. Accordingly, the final loss function of the disparity estimation system 100 may be the sum of loss functions output by respective disparity processing sub-networks or disparity processing of respective stages.

According to some other embodiments, when each sub-network of the initial disparity generation sub-network 301 and the at least one disparity refinement sub-network 302 is trained with unsupervised training, the loss function of each disparity processing sub-network or disparity processing of each stage may be obtained by reconstructing the image and computing the reconstruction error. As an example, the loss function of a disparity processing sub-network is computed, and then the computed loss function may be expressed as Loss=∥I$_1$−warpI$_1$∥$_2^2$, where warpI$_1$=warp(I$_2$, Disp$_1$) and the warp function represents that the second image I2 is reconstructed into the first image I1 according to the disparity computed by the disparity processing sub-network.

In the following, as an example, each sub-network of the initial disparity generation sub-network 301 and the at least one disparity refinement sub-network 302 is trained with supervised training, a Scene Flow is used as the training set, and the structure of the disparity estimation system is shown in FIG. 5, a reference image, a corresponding disparity map with ground truth, and the result obtained by applying the trained parameter to the reference image of a Middlebury dataset are illustrated with reference to FIGS. 7A, 7B, and 8.

Figure 7A:
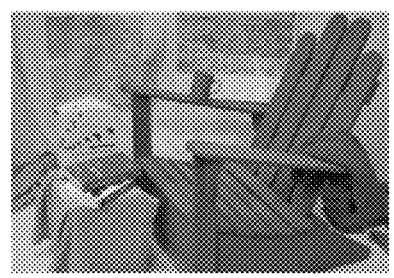
FIGS. 7A and 7B are respectively schematic diagrams illustrating a reference image and a corresponding disparity map with ground truth on which the network is based according to exemplary embodiments of the present disclosure.
Figure 7B:
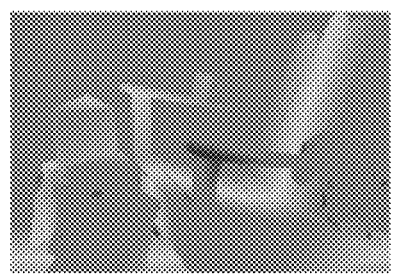
Figure 8:
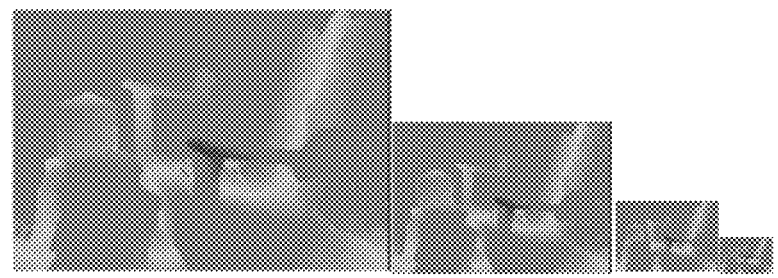
FIG. 8 is a schematic diagram illustrating multiple disparity maps with successively increasing sizes from right to left according to exemplary embodiments of the present disclosure, in which the multiple disparity maps are obtained by performing cascaded multi-stage disparity processing on the reference image shown in FIG. 7A by using a trained disparity estimation system.

FIGS. 7A and 7B are respectively schematic diagrams illustrating a reference image and a corresponding disparity map with ground truth on which the network is based according to exemplary embodiments of the present disclosure. FIG. 8 is a schematic diagram illustrating multiple disparity maps with successively increasing sizes from right to left (i.e., the result obtained by applying the trained parameter to pictures of a Middlebury dataset) according to exemplary embodiments of the present disclosure, the multiple disparity maps are obtained by performing cascaded multi-stage disparity processing on the reference image shown in FIG. 7A by using a trained disparity estimation system. As can be seen from the above accompanying drawings, the size of the obtained multiple disparity maps are successively increased, and the accuracy can be successively increased, and the accuracy of the disparity map of the maximum size is close to the accuracy of the disparity map with ground truth. In addition, although FIGS. 7A, 7B, and 8 respectively illustrate the reference image, the disparity map with ground truth, and the generated multiple disparity maps in the form of grayscale images, it may be understood that when the reference image shown in FIG. 7A is a color image, the disparity maps shown in FIGS. 7B and 8 may be corresponding color images.

According to some embodiments, the disparity generation network 300 may further be configured to select, according to performance of a target device, a disparity map whose size matches the performance of the target device from the multiple disparity maps as a disparity map to be provided to the target device. For example, when the performance of the target device is high and/or accuracy of the disparity map required by the target device is high, a disparity map of a large size may be selected from the multiple disparity maps and provided to the target device. In addition, the target device may also actively acquire, according to its performance, the required disparity map from the multiple disparity maps obtained by the disparity estimation system, which is not limited.

In addition, although not shown, the multiple disparity maps obtained by the disparity estimation system may also be provided to the corresponding target device for further processing. For example, the multiple disparity maps may be provided to the corresponding target device, such that the target device obtains the depth map based on the disparity map, and then obtains depth information of the scene, so as to be applied to various application scenarios such as three-dimensional reconstruction, automated driving, and obstacle detection.

The exemplary disparity estimation system according to the present disclosure has been described above with reference to FIGS. 1 to 8. Exemplary embodiments of an exemplary disparity estimation method and an exemplary electronic device according to the present disclosure will be described below with reference to FIGS. 9, 10, and 11. It should be noted that various definitions, embodiments, implementations, examples and the like described above with reference to FIGS. 1 to 8 may also be applied to or combined with the exemplary embodiments described below.

Figure 9:
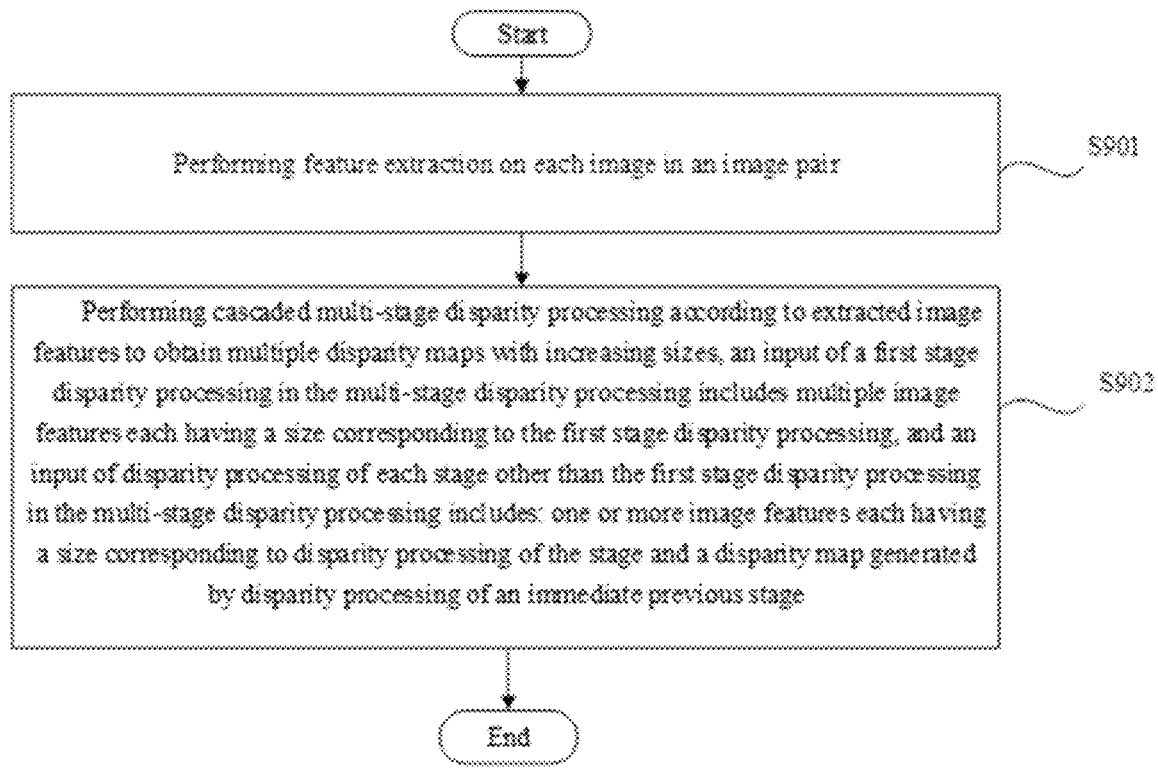
FIG. 9 is a flowchart illustrating a disparity estimation method according to exemplary embodiments of the present disclosure.

According to some embodiments, FIG. 9 is a flowchart illustrating a disparity estimation method according to exemplary embodiments of the present disclosure. As shown in FIG. 9, the disparity estimation method may include the following operations: performing feature extraction on each image in an image pair (block S901); and performing cascaded multi-stage disparity processing according to extracted image features to obtain multiple disparity maps with increasing sizes (block S902). The input of the first stage disparity processing in the multi-stage disparity processing includes multiple image features each having a size corresponding to the first stage disparity processing. The input of disparity processing of each stage other than the first stage disparity processing in the multi-stage disparity processing includes: one or more image features each having a size corresponding to the disparity processing of the stage and a disparity map generated by disparity processing of an immediate previous stage.

According to some embodiments, the image pair may be an image pair for the same scene captured by a multiocular camera. The size of each image in the image pair is the same, and the corresponding angle of view is different. In addition, each image in the image pair may be a grayscale image or a color image.

According to some embodiments, the extracted image feature of each image in the image pair may include at least one or more of the following features: the basic structure feature, the semantic feature, the edge feature, the texture feature, the color feature, the object shape feature, or the image-self-based feature. For example, the image feature of the first image (e.g., the left-view image) in the image pair may include the basic structure feature, the semantic feature, and the edge feature, and the image feature of the second image (e.g., the right-view image) in the image pair may include the basic structure feature. Alternatively, the image feature of the first image and the second image in the image pair may include the basic structure feature, the semantic feature, the edge feature, etc.

According to some embodiments, a size of the disparity map having the maximum size in the multiple disparity maps may be consistent with the size of each image in the image pair. In some other examples, the size of respective disparity maps of the multiple disparity maps may be less than the size of each image in the image pair. In addition, in any two adjacent disparity maps of the multiple disparity maps, the height and width of the latter disparity map may be respectively twice the height and width of the previous disparity map. In some other examples, the height and width may also be respectively 3 times, 4 times, or other times (e.g., a positive integer greater than 1) the height and width of the former disparity map according to the actual required accuracy. For example, there are 4 disparity maps, and the size of the last disparity map in the multiple disparity maps is H×W (which may be consistent with the size of each image in the image pair), and then the size of other three disparity maps arranged before the last disparity map may be successively:

$$\frac{H}{2} \times \frac{W}{2}$$

(which may be referred to as ½ size if H×W size is referred to as full size), $$\frac{H}{4} \times \frac{W}{4}$$

(which may be referred to as ¼ size), and $$\frac{H}{8} \times \frac{W}{8}$$

(which may be referred to as ⅛ size).

Figure 10:
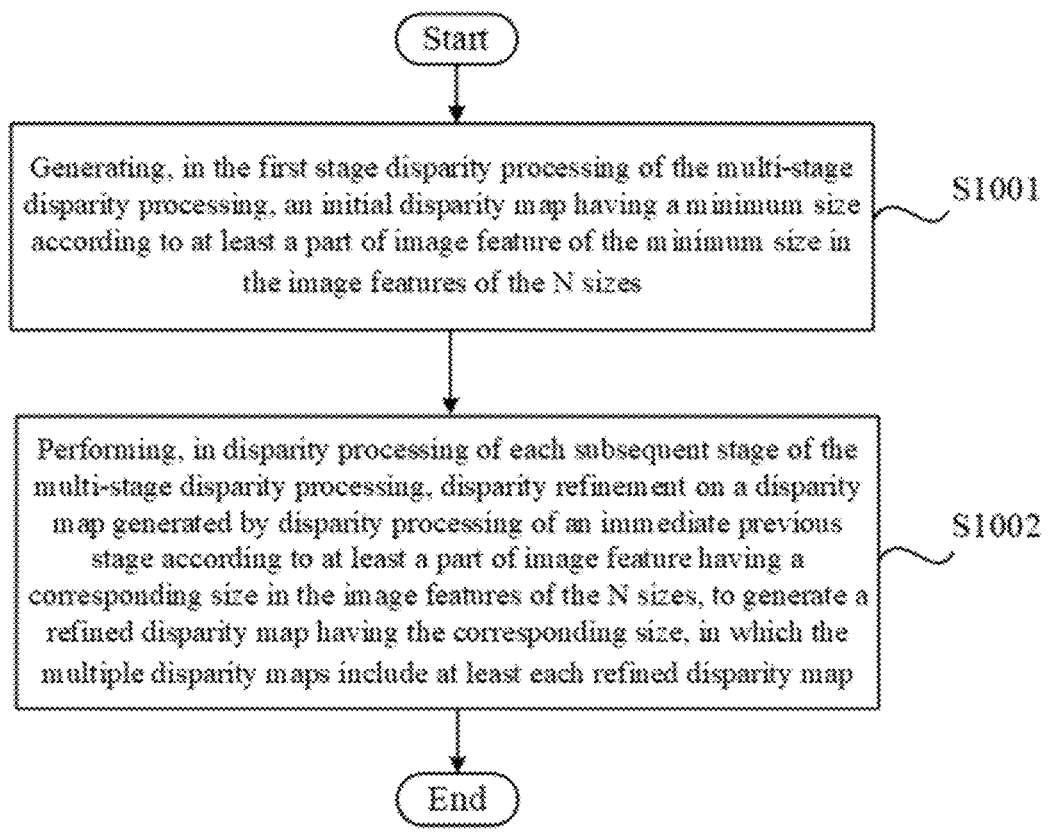
FIG. 10 is a flowchart illustrating multi-stage disparity processing according to exemplary embodiments of the present disclosure.

According to some embodiments, the extracted image features may include image features of N sizes, where N may be a positive integer not less than 2. Accordingly, as shown in FIG. 10, which is a flowchart illustrating multi-stage disparity processing according to exemplary embodiments of the present disclosure, performing cascaded multi-stage disparity processing according to extracted image features to obtain multiple disparity maps with increasing sizes may include the following operations.

At block S1001, in the first stage disparity processing of the multi-stage disparity processing, an initial disparity map having a minimum size according to at least a part of the image feature of the minimum size in the image features of the N sizes is generated.

As an example, the extracted image features of the N sizes include image features of ⅛ size, ¼ size, ½ size, and the full size. In the first stage disparity processing of the multi-stage disparity processing, the initial disparity map having the minimum size (i.e., the ⅛ size) can be generated according to at least a part of the image feature of the minimum size (i.e., the ⅛ size) in the image features of 4 sizes.

In addition, as shown in the above Tables 1 and 2, the initial disparity map may be obtained by performing disparity shift on the corresponding image features having the corresponding size by using the 3DCNN, or the initial disparity map may be obtained by computing the difference between the shifted image features of the corresponding size by using the 2DCNN.

At block S1002, in disparity processing of each subsequent stage of the multi-stage disparity processing, disparity refinement is performed on a disparity map generated by disparity processing of an immediate previous stage according to at least a part of the image feature having a corresponding size in the image features of the N sizes, to generate a refined disparity map having the corresponding size, in which the multiple disparity maps include at least each refined disparity map.

According to some embodiments, the multi-stage disparity processing may include disparity processing of N+1 stages. Accordingly, performing, in disparity processing of each subsequent stage in the multi-stage disparity processing, disparity refinement on the disparity map generated by disparity processing of the immediate previous stage according to at least a part of the image feature having the corresponding size in the image features of the N sizes to generate the refined disparity map having the corresponding size, in which the multiple disparity maps include at least each refined disparity map, may include: successively performing, in disparity processing of N stages other than the first stage disparity processing, disparity refinement on a disparity map generated by disparity processing of an immediate previous stage based on at least a part of an image feature having a corresponding size in the image features of the N sizes in ascending order of sizes, to obtain N refined disparity maps with successively increasing sizes, and taking the N refined disparity maps as the multiple disparity maps. The sizes of the N refined disparity maps correspond to the N sizes, respectively.

As an example, the extracted image features of the N sizes include image features of ⅛ size, ¼ size, ½ size, and full size, and the multi-stage disparity processing include disparity processing of 4+1 stages, in disparity processing of the four stages other than the first stage disparity processing, disparity refinement may be successively performed on the disparity map generated by disparity processing of the immediate previous stage based on at least a part of the image feature having the corresponding size in the image features of the 4 sizes in ascending order of sizes, to obtain four refined disparity maps with successively increasing sizes (e.g., the refined disparity map of ⅛ size, the refined disparity map of ¼ size, the refined disparity map of ½ size, and the refined disparity map of full size), and then the four refined disparity maps may be taken as the multiple disparity maps.

According to some other embodiments, the multi-stage disparity processing may include disparity processing of N stages. Accordingly, performing, in disparity processing of each subsequent stage in the multi-stage disparity processing, disparity refinement on the disparity map generated by disparity processing of the immediate previous stage according to at least a part of the image feature having the corresponding size in the image features of the N sizes, to generate the refined disparity map having the corresponding size, in which the multiple disparity maps include at least each refined disparity map, may include: successively performing, in disparity processing of N−1 stages other than the first stage disparity processing, disparity refinement on the disparity map generated by disparity processing of the immediate previous stage based on at least a part of the image feature having the corresponding size in image features of N−1 non-minimum sizes of the image features of the N sizes in ascending order of sizes, to obtain N−1 refined disparity maps with successively increasing sizes; and taking the initial disparity map and the N−1 refined disparity maps as the multiple disparity maps. The sizes of the initial disparity map and the N−1 refined disparity maps correspond to the N sizes, respectively.

For example, the extracted image features of the N sizes include image features of ⅛ size, ¼ size, ½ size, and full size, and the multi-stage disparity processing include disparity processing of 4 stages, in disparity processing of the three stages other than the first stage disparity processing, disparity refinement may be successively performed on the disparity map generated by disparity processing of the immediate previous stage based on at least part of the image feature having the corresponding size in image features of the other 3 non-minimum sizes in ascending order of sizes, to obtain three refined disparity maps with successively increasing sizes (e.g., the refined disparity map of ¼ size, the refined disparity map of ½ size, and the refined disparity map of full size), and use the initial disparity map and the three refined disparity maps as the multiple disparity maps.

Thereby, the obtained multiple disparity maps include or do not include the initial disparity map generated by the first stage disparity processing, so as to improve the flexibility of disparity generation.

According to some embodiments, performing, in disparity processing of each subsequent stage in the multi-stage disparity processing, disparity refinement on the disparity map generated by disparity processing of the immediate previous stage according to at least a part of the image feature having the corresponding size in the image features of the N sizes to generate the refined disparity map having the corresponding size, may include: performing, in disparity processing of each stage other than the first stage disparity processing of the multi-stage disparity processing, residual computation on a disparity map generated by disparity processing of an immediate previous stage based on at least a part of the image feature having the corresponding size, to obtain a residual map having the corresponding size, and combining the residual map having the corresponding size with the disparity map generated by disparity processing of the immediate previous stage to obtain a refined disparity map having the corresponding size.

For example, the extracted image features of the N sizes include image features of ⅛ size, ¼ size, ½ size, and full size, and the multi-stage disparity processing include disparity processing of 4+1 stages, in disparity processing corresponding to ⅛ size (i.e., disparity refinement corresponding to ⅛ size) of disparity processing of 4 stages other than the first stage disparity processing, a first residual map of ⅛ size may be obtained based on part or all of the extracted image feature of the ⅛ size and the initial disparity map generated by disparity processing of the immediate previous stage, and the first refined disparity map of ⅛ size can be obtained based on the first residual map and the initial disparity map. In next stage disparity refinement corresponding to ¼ size, a second residual map of ¼ size may be obtained based on part or all of the extracted image feature of ¼ size and the first refined disparity map generated by disparity processing of the immediate previous stage, and a second refined disparity map of ¼ size can be obtained based on the second residual map and the first refined disparity map, and so on.

According to some embodiments, in disparity processing of each stage other than the first stage disparity processing of the multi-stage disparity processing, and before disparity refinement is performed on the disparity map generated by disparity processing of the immediate previous stage, the method may further include: in response to the size of the disparity map generated by disparity processing of the immediate previous stage being less than the size corresponding to the current stage disparity processing, upsampling the disparity map generated by disparity processing of the immediate previous stage to the size corresponding to the current stage disparity processing.

For example, the extracted image features of the N sizes still include image features of ⅛ size, ¼ size, ½ size, and full size, and the multi-stage disparity processing include disparity processing of 4+1 stages, in disparity processing corresponding to ¼ size (i.e., disparity refinement corresponding to ¼ size) of disparity processing of 4 stages other than the first stage disparity processing, the first refined disparity map of the ⅛ size generated by disparity processing of the immediate previous stage may be upsampled to ¼ size corresponding to the current stage disparity processing, and then disparity refinement may be performed on the upsampled first refined disparity map of the ¼ size based on part or all of the extracted image feature of the ¼ size, to obtain the second refined disparity map of the ¼ size.

According to some embodiments, the image feature of the minimum size in the image features of the N sizes may include, for example, at least one type of image feature of a first image and at least one type of image feature of a second image in the image pair. For example, the image feature of the minimum size in the image features of the N sizes may include the basic structure feature, the semantic feature and the edge feature of the first image (e.g., the left-view image) in the image pair, and the basic structure feature of the second image (e.g., the right-view image) in the image pair.

The image feature of each non-minimum size in the image features of the N sizes may include, for example, at least one type of image feature of the first image and/or at least one type of image feature of the second image in the image pair. For example, the image feature of each non-minimum size in the image features of the N sizes may include the edge feature of the first image or the image-self-based feature of the first image in the image pair.

In addition, referring to the above system embodiment, image features based on which different refined disparity maps are generated may be image features of a same type or image features of different types. In some other examples, the image feature based on which different refined disparity maps are generated may be image features of the same image or different images in the image pair.

The image feature based on which each refined disparity map is generated may include, for example, the edge feature of at least one image in the image pair and/or the image-self-based feature of at least one image in the image pair. The image-self-based feature of the at least one image in the image pair may include, for example, the at least one image itself, or the image obtained by downsampling the at least one image itself according to the size of the refined disparity map to be generated.

According to some embodiments, the disparity estimation method may further include: computing a loss function of disparity processing of each stage in the multi-stage disparity processing. The loss function may represent an error between the disparity in the disparity map generated by the disparity processing of the stage and the corresponding real disparity. Thereby, by computing the loss function, the accuracy of each disparity map can be determined, and the disparity estimation method can be further optimized based on the loss function.

According to some embodiments, the disparity estimation method may further include: selecting, according to performance of a target device, the disparity map whose size matches the performance of the target device from the multiple disparity maps as the disparity map to be provided to the target device. For example, when the performance of the target device is high and/or accuracy of the disparity map required by the target device is high, the disparity map of a large size may be selected from the multiple disparity maps and provided to the target device. In addition, the target device may also actively acquire, according to its performance, the required disparity map from the multiple disparity maps obtained by the disparity estimation system.

Moreover, the disparity estimation method may further include: before image feature extraction is performed on each image in the image pair, performing epipolar rectification on the images in the image pair, such that the images in the image pair have disparity in one direction (e.g., a horizontal direction). Thus, the disparity search range of the image can be limited to one direction, thereby improving the efficiency of subsequent feature extraction and disparity generation.

An aspect of the present disclosure may include an electronic device. The electronic device may include: a processor; and a memory that stores a program, the program including instructions that, when executed by the processor, cause the processor to perform any of the methods above.

An aspect of the present disclosure may include a computer-readable storage medium that stores a program, the program including instructions that, when executed by a processor of an electronic device, cause the electronic device to perform any of the methods.

Figure 11:
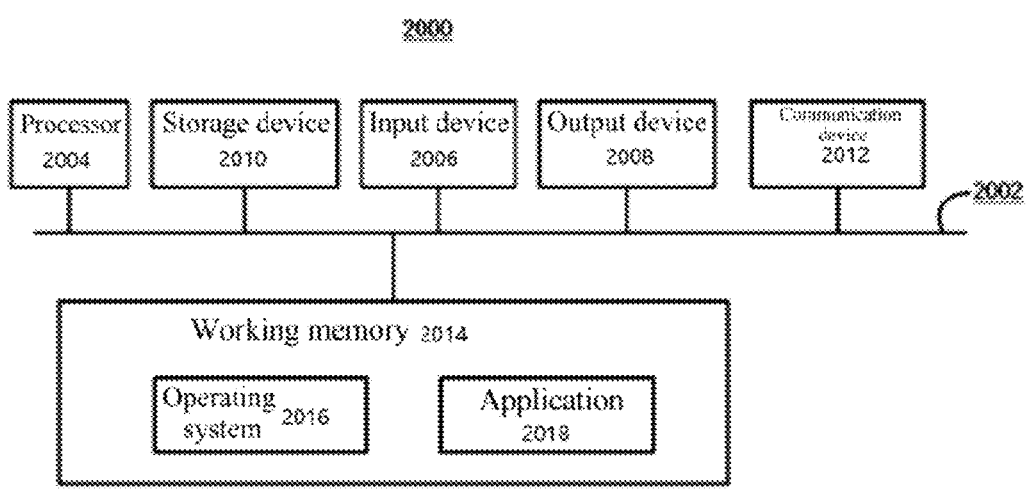
FIG. 11 is a block diagram illustrating an exemplary computing device applicable to exemplary embodiments of the present disclosure.

Referring to FIG. 11, a computing device 2000 is described. The computing device 2000 is an example of a hardware device that can be applied to various aspects of the present disclosure. The computing device 2000 may be any machine configured to perform processing and/or computing, which may be, but is not limited to, a workstation, a server, a desktop computer, a laptop computer, a tablet computer, a personal digital assistant, a smart phone, an on-board computer, or any combination thereof. The above electronic device may be implemented, in whole or at least in part, by the computing device 2000 or a similar device or system.

The computing device 2000 may include elements in connection with a bus 2002 or in communication with a bus 2002 (possibly via one or more interfaces). For example, the computing device 2000 may include a bus 2002, one or more processors 2004, one or more input devices 2006, and one or more output devices 2008. The one or more processors 2004 may be any type of processors and may include, but are not limited to, one or more general purpose processors and/or one or more dedicated processors (e.g., special processing chips). The input device 2006 may be any type of device capable of inputting information to the computing device 2000, and may include, but is not limited to, a mouse, a keyboard, a touch screen, a microphone, and/or a remote controller. The output device 2008 may be any type of device capable of presenting information, and may include, but is not limited to, a display, a loudspeaker, an audio/video output terminal, a vibrator, and/or a printer. The computing device 2000 may further include a storage device 2010 or be connected to the storage device 2010. The storage device may be non-transitory and may be any storage device capable of implementing data storage, and may include, but is not limited to, a disk drive, an optical storage device, a solid-state memory, a floppy disk, a flexible disk, a hard disk, a magnetic tape, or any other magnetic medium, an optical disk or any other optical medium, a read-only memory (ROM), a random access memory (RAM), a cache memory and/or any other memory chip or cartridge, and/or any other medium from which a computer can read data, instructions, and/or codes. The storage device 2010 may be detached from an interface. The storage device 2010 may have data/programs (including instructions)/codes for implementing the above methods and steps. The computing device 2000 may also include a communication device 2012. The communication device 2012 may be any type of device or system capable of communicating with an external device and/or a network, and may include, but is not limited to, a modem, a network card, an infrared communication device, a wireless communication device, and/or a chipset, for example, a Bluetooth™ device, a 1302.11 device, a WiFi device, a WiMax device, a cellular communication device, and/or the like.

The computing device 2000 may further include a working memory 2014, which may be any type of working memory capable of storing programs (including instructions) and/or data useful to the working of the processor 2004, and may include, but is not limited to, a random-access memory and/or a read-only memory.

Software elements (programs) may be located in the working memory 2014, and may include, but are not limited to, an operating system 2016, one or more applications (that is, application programs) 2018, drivers, and/or other data and codes. Instructions for performing the above-mentioned methods and steps may be included in the one or more applications 2018, and the feature extraction network 200 and the disparity generation network 300 of the above disparity estimation system 100 may be implemented by the processor 2004 by reading and executing instructions of the one or more applications 2018. More specifically, the feature extraction network 200 of the above disparity estimation system 100 may be implemented, for example, by the processor 2004 by executing the application 2018 having an instruction for performing block S901. Moreover, the disparity generation network 300 of the above disparity estimation system 100 may be implemented, for example, by the processor 2004 by executing the application 2018 having an instruction for performing block S902, and so on. Executable codes or source codes of the instructions of the software elements (programs) may be stored in a non-transitory computer-readable storage medium (e.g., the above storage device 2010), and may be stored in the working memory 2014 when executed (may be compiled and/or installed). The executable codes or source codes of the instructions of the software elements (programs) may also be downloaded from a remote location.

It should also be understood that various variations may be made according to specific requirements. For example, custom hardware may also be used, and/or specific elements may be implemented in hardware, software, firmware, middleware, microcodes, hardware description languages, or any combination thereof. For example, some or all of the disclosed methods and devices may be implemented by programming hardware (e.g., a programmable logic circuit including a field programmable gate array (FPGA) and/or a programmable logic array (PLA)) in an assembly language or a hardware programming language (such as VERILOG, VHDL, and C++) by using the logic and the algorithm according to the present disclosure.

It should also be understood that the above method may be implemented in a server-client mode. For example, the client may receive data input by a user and send the data to the server. The client can also receive data input by the user, perform a part of the processing in the above method, and send the data obtained through the processing to the server. The server may receive the data from the client, perform the above method or another part of the above method, and return an execution result to the client. The client may receive the execution result of the method from the server, and may present the execution result to the user by means of, for example, an output device.

It should also be understood that the components of the computing device 2000 may be distributed over a network. For example, some processing may be performed by one processor while other processing may be performed by another processor away from the processor. Other components of the computing device 2000 may also be similarly distributed. In this way, the computing device 2000 can be interpreted as a distributed computing system that performs processing at multiple positions.

Although the embodiments or the examples of the present disclosure have been described with reference to the accompanying drawings, it should be understood that the above methods, systems, and devices are merely exemplary embodiments or examples, and the scope of the present invention is not limited by the embodiments or the examples, but only defined by the appended authorized claims and equivalent scope thereof. Various elements in the embodiments or examples may be omitted or substituted by equivalent elements thereof. Moreover, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. An electronic device, comprising:
   a processor; and
   a memory that stores a program, the program comprising instructions that, when executed by the processor, cause the processor to:
   extract image features by performing feature extraction on each image in an image pair; and
   perform cascaded multi-stage disparity processing based on the extracted image features to obtain a plurality of disparity maps between images in the image pair with increasing sizes,
   wherein an input of a first stage disparity processing in the multi-stage disparity processing comprises a plurality of image features of the extracted image features each having a size corresponding to the first stage disparity processing, and an input of a stage of disparity processing other than the first stage disparity processing in the multi-stage disparity processing comprises: one or more image features of the extracted image features each having a size corresponding to the disparity processing of the stage and a disparity map generated by disparity processing of an immediate previous stage,
   wherein the extracted image features comprise image features of N sizes, and N is a positive integer not less than 2;
   wherein the multi-stage disparity processing comprises disparity processing of N+1 stages;
   wherein the instructions, when executed by the processor, further cause the processor to:
   generate, in the first stage disparity processing of the multi-stage disparity processing, an initial disparity map having a minimum size based on at least a part of an image feature of the minimum size in the image features of the N sizes, and
   successively perform, in disparity processing of N stages other than the first stage disparity processing, disparity refinement on a disparity map generated by disparity processing of an immediate previous stage, based on at least a part of an image feature having a corresponding size in the image features of the N sizes in ascending order of sizes, to obtain N refined disparity maps with successively increasing sizes; and
   identify the N refined disparity maps as the plurality of disparity maps, wherein sizes of the N refined disparity maps correspond to the N sizes, respectively.

2. The electronic device according to claim 1, wherein, the instructions, when executed by the processor, further cause the processor to:
   perform, in disparity processing of a stage other than the first stage disparity processing of the multi-stage disparity processing, residual computation on a disparity map generated by disparity processing of an immediate previous stage based on at least a part of an image feature having a corresponding size, to obtain a residual map having the corresponding size; and
   combine the residual map having the corresponding size with the disparity map generated by disparity processing of the immediate previous stage to obtain a refined disparity map having the corresponding size.

3. The electronic device according to claim 1, wherein, the instructions, when executed by the processor, further cause the processor to:
   upsample, in disparity processing of a stage other than the first stage disparity processing of the multi-stage disparity processing and before performing disparity refinement on a disparity map generated by disparity processing of an immediate previous stage, the disparity map generated by the disparity processing of the immediate previous stage to a size corresponding to disparity processing of the stage, in response to a size of the disparity map generated by disparity processing of the immediate previous stage being less than a size corresponding to the disparity processing of the stage.

4. The electronic device according to claim 1, wherein the image feature of the minimum size in the image features of the N sizes comprises at least one type of image feature of a first image in the image pair and at least one type of image feature of a second image in the image pair, and an image feature of each non-minimum size in the image features of the N sizes comprises at least one type of image feature of the first image and/or at least one type of image feature of the second image.

5. The electronic device according to claim 1, wherein an image feature based on which each refined disparity map is generated comprises one or more of an edge feature of an image in the image pair or an image-self-based feature of an image in the image pair.

6. The electronic device according to claim 5, wherein the image-self-based feature of the image in the image pair comprises the image, or an image obtained by downsampling the image according to a size of a refined disparity map to be generated.

7. A disparity estimation method, comprising:
   performing feature extraction on each image in an image pair to obtain extracted image features of images in the image pair; and performing cascaded multi-stage disparity processing based on the extracted image features to obtain a plurality of disparity maps between the images in the image pair with increasing sizes, wherein an input of a first stage disparity processing in the multi-stage disparity processing comprises a plurality of image features of the extracted image features each having a size corresponding to the first stage disparity processing, and an input of a stage of disparity processing other than the first stage disparity processing in the multi-stage disparity processing comprises: one or more image features of the extracted image features each having a size corresponding to the disparity processing of the stage and a disparity map generated by disparity processing of an immediate previous stage, wherein the extracted image features comprise image features of N sizes, and N is a positive integer not less than 2, wherein the multi-stage disparity processing comprises disparity processing of N+1 stages, wherein performing cascaded multi-stage disparity processing based on the extracted image features to obtain the plurality of disparity maps with increasing sizes comprises:

generating, in the first stage disparity processing of the multi-stage disparity processing, an initial disparity map having a minimum size based on at least a part of an image feature of the minimum size in the image features of the N sizes, successively performing, in disparity processing of N stages other than the first stage disparity processing, disparity refinement on a disparity map generated by disparity processing of an immediate previous stage based on at least a part of an image feature having a corresponding size in the image features of the N sizes in ascending order of sizes, to obtain N refined disparity maps with successively increasing sizes, and identifying the N refined disparity maps as the plurality of disparity maps, wherein sizes of the N refined disparity maps correspond to the N sizes, respectively.

8. The disparity estimation method according to claim 7, wherein, performing, in disparity processing of the stage of the multi-stage disparity processing subsequent to the first stage disparity processing, disparity refinement on the disparity map generated by disparity processing of the immediate previous stage based on at least a part of the image feature having the corresponding size in the image features of the N sizes to generate the refined disparity map having the corresponding size comprises:

performing, in disparity processing of a stage other than the first stage disparity processing of the multi-stage disparity processing, residual computation on a disparity map generated by disparity processing of an immediate previous stage based on at least a part of an image feature having a corresponding size, to obtain a residual map having the corresponding size, and combining the residual map having the corresponding size with the disparity map generated by disparity processing of the immediate previous stage to obtain a refined disparity map having the corresponding size.

9. The disparity estimation method according to claim 7, wherein in disparity processing of a stage other than the first stage disparity processing of the multi-stage disparity processing, and before performing disparity refinement on a disparity map generated by disparity processing of an immediate previous stage, the method further comprises:

in response to a size of the disparity map generated by disparity processing of the immediate previous stage being less than a size corresponding to the disparity processing of the stage, upsampling the disparity map generated by the disparity processing of the immediate previous stage to the size corresponding to the disparity processing of the stage.

10. The disparity estimation method according to claim 7, wherein the image feature of the minimum size in the image features of the N sizes comprises at least one type of image feature of a first image in the image pair and at least one type of image feature of a second image in the image pair, and an image feature of each non-minimum size in the image features of the N sizes comprises at least one type of image feature of the first image and/or at least one type of image feature of the second image.

11. The disparity estimation method according to claim 7, wherein an image feature based on which each refined disparity map is generated comprises one or more of an edge feature of an image in the image pair and/or an image-self-based feature of an image in the image pair.

12. The disparity estimation method according to claim 11, wherein the image-self-based feature of the image in the image pair comprises the image, or an image obtained by downsampling the image based on a size of a refined disparity map to be generated.

13. A non-transitory computer-readable storage medium that stores a program, the program comprising instructions that, when executed by a processor of an electronic device, cause the electronic device to:

perform feature extraction on each image in an image pair to obtain extracted image features of images in the image pair; and perform cascaded multi-stage disparity processing based on the extracted image features to obtain a plurality of disparity maps between the images in the image pair with increasing sizes, wherein an input of a first stage disparity processing in the multi-stage disparity processing comprises a plurality of image features of the extract image features each having a size corresponding to the first stage disparity processing, and an input of a stage of disparity processing other than the first stage disparity processing in the multi-stage disparity processing comprises: one or more image features of the extracted image features each having a size corresponding to the disparity processing of the stage and a disparity map generated by disparity processing of an immediate previous stage, wherein the extracted image features comprise image features of N sizes, and N is a positive integer not less than 2;

wherein the multi-stage disparity processing comprises disparity processing of N+1 stages;

wherein the instructions, when executed by the processor, further cause the electronic device to:

generate, in the first stage disparity processing of the multi-stage disparity processing, an initial disparity map having a minimum size based on at least a part of an image feature of the minimum size in the image features of the N sizes; and successively perform, in disparity processing of N stages other than the first stage disparity processing, disparity refinement on a disparity map generated by disparity processing of an immediate previous stage, based on at least a part of an image feature having a corresponding size in the image features of the N sizes in ascending order of sizes, to obtain N refined disparity maps with successively increasing sizes; and identify the N refined disparity maps as the plurality of disparity maps, wherein sizes of the N refined disparity maps correspond to the N sizes, respectively.

* * * * *